(12) United States Patent
Bahrami et al.

(10) Patent No.: US 10,477,395 B2
(45) Date of Patent: Nov. 12, 2019

(54) OPEN PUBLIC INTERNET-OF-THINGS SYSTEMS AND METHODS

(71) Applicant: FUJITSU LIMITED, Kawasaki-shi, Kanagawa (JP)

(72) Inventors: Mehdi Bahrami, Santa Clara, CA (US); Wei-Peng Chen, Fremont, CA (US); Takuki Kamiya, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 174 days.

(21) Appl. No.: 15/804,943

(22) Filed: Nov. 6, 2017

(65) Prior Publication Data
US 2019/0141526 A1    May 9, 2019

(51) Int. Cl.
| | |
|---|---|
| *H04L 29/06* | (2006.01) |
| *H04W 12/06* | (2009.01) |
| *H04L 29/08* | (2006.01) |
| *H04W 12/08* | (2009.01) |

(52) U.S. Cl.
CPC ........... *H04W 12/06* (2013.01); *H04L 63/083* (2013.01); *H04L 63/107* (2013.01); *H04L 67/10* (2013.01); *H04W 12/08* (2013.01)

(58) Field of Classification Search
CPC ..... H04W 12/06; H04L 63/083; H04L 63/107
See application file for complete search history.

(56) References Cited

U.S. PATENT DOCUMENTS

| | | | | |
|---|---|---|---|---|
| 2014/0187267 | A1* | 7/2014 | Yang | H04W 4/80 455/456.3 |
| 2015/0168532 | A1* | 6/2015 | Hampel | H04W 4/029 342/450 |
| 2015/0222621 | A1 | 8/2015 | Baum et al. | |
| 2016/0148269 | A1* | 5/2016 | Lamont | G06Q 30/0267 705/14.63 |
| 2016/0197772 | A1* | 7/2016 | Britt | H04W 4/70 370/254 |
| 2016/0295616 | A1* | 10/2016 | Zakaria | H04W 76/14 |

OTHER PUBLICATIONS

U.S. Appl. No. 15/373,799, filed Dec. 9, 2016.

* cited by examiner

*Primary Examiner* — Chau Le
*Assistant Examiner* — Vance M Little
(74) *Attorney, Agent, or Firm* — Maschoff Brennan

(57) ABSTRACT

A method of public information communication from an open public Internet-of-Things (IoT) device may include measuring a physical phenomenon. The method includes determining a location of an IoT device. The method includes broadcasting a network address and the location of the IoT device such that mobile devices within a particular proximity of the IoT device has access to the network address and the location. The method includes receiving an access request for public information at the network address from a mobile device positioned within the particular proximity to the IoT device. The public information includes a raw form of data measured by the physical sensor that is configured to be locally processed on the mobile devices. The method includes directly communicating the public information to the mobile device via a communication network without authentication or configuration between the IoT device and the mobile device.

20 Claims, 10 Drawing Sheets

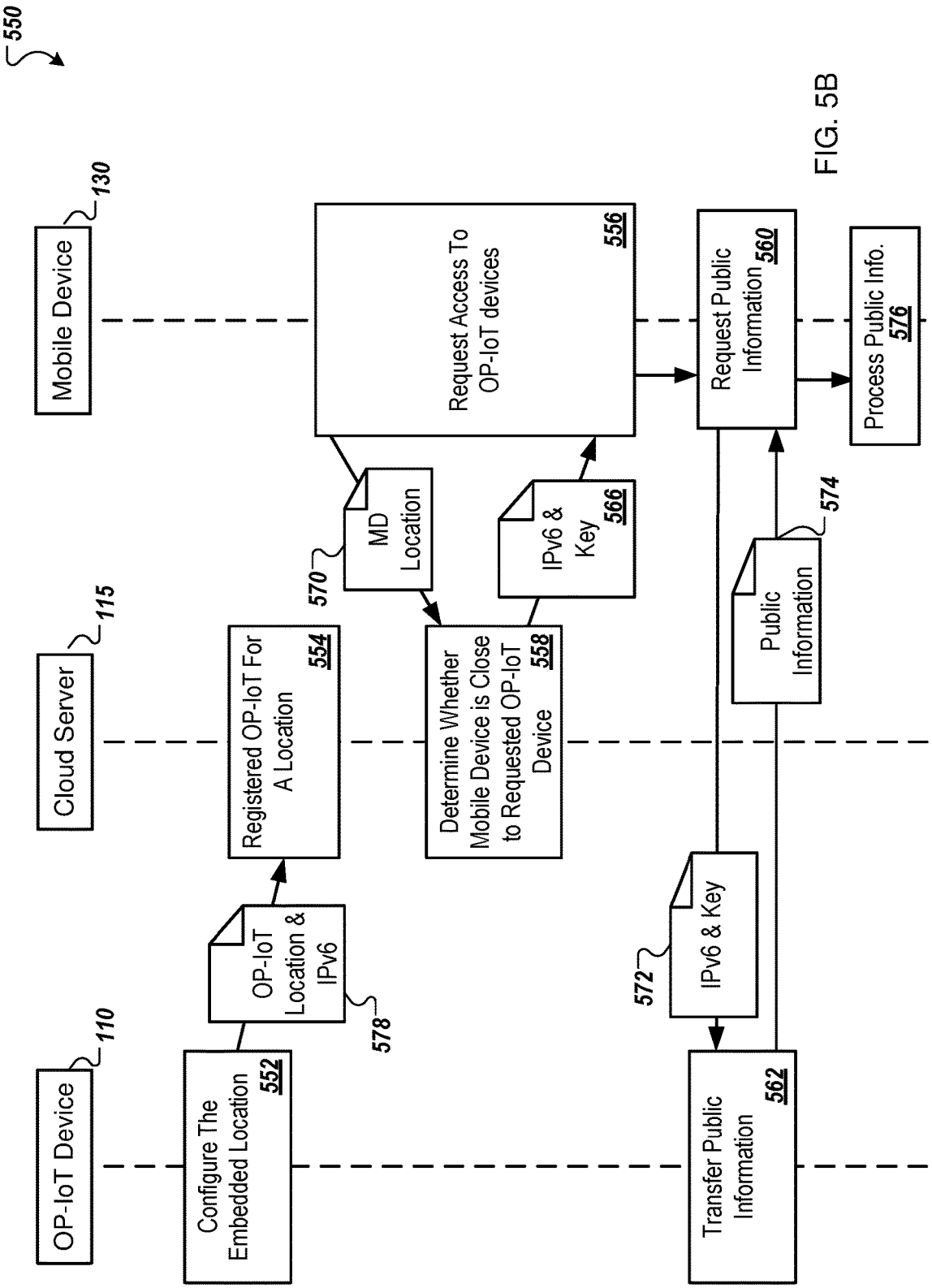

OPEN PUBLIC INTERNET-OF-THINGS SYSTEMS AND METHODS

FIELD

The embodiments discussed herein are related to Open Public Internet of Things (OP-IoT) systems and methods.

BACKGROUND

The Internet-of-Things (IoT) includes networks of IoT devices that are communicatively connected. The IoT allows the connected IoT devices to be controlled locally and/or remotely and to communicate measured data. In order to control the IoT devices, a client-based configuration, authentication among the IoT devices, and protocol binding may be required. These requirements may limit access to the measured data.

The subject matter claimed herein is not limited to embodiments that solve any disadvantages or that operate only in environments such as those described. Rather, this background is only provided to illustrate one example technology area where some embodiments described herein may be practiced.

SUMMARY

According to an aspect of an embodiment, a method of public information communication from an Open Public Internet-of-Things (IoT) device may include measuring a physical phenomenon by a physical sensor of an IoT device. The method may include determining a location of an IoT device using a locational sensor of the IoT device. The method may include broadcasting a network address of the IoT device and the location of the IoT device such that mobile devices within a particular proximity of the IoT device has access to the network address and the location. The method may include receiving an access request for public information at the network address from a mobile device of the mobile devices that is positioned within a particular proximity to the IoT device. The public information may include a raw form of data measured by the physical sensor that is configured to be locally processed on the mobile devices. The method may include directly communicating the public information to the mobile device via a communication network without authentication or configuration between the IoT device and the mobile device.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 5B depicts an example second peer-to-cloud (P2C) process that may be implemented in the operating environment of FIG. 1;

DESCRIPTION OF EMBODIMENTS

Figure 1:
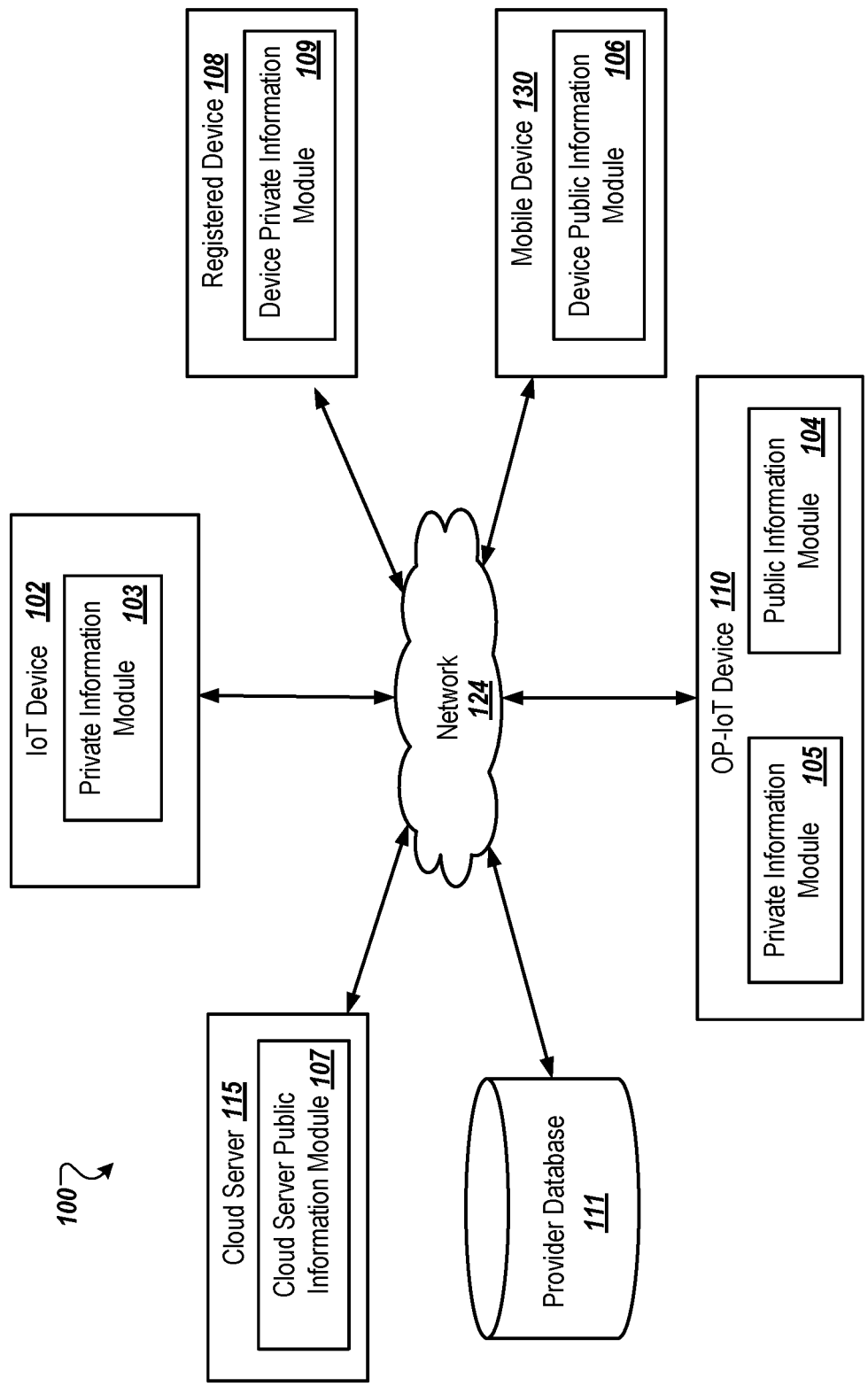
FIG. 1 is a block diagram of an example operating environment in which some embodiments may be implemented.

The Internet-of-Things (IoT) includes one or more networks of IoT devices that are communicatively connected. The IoT allows the connected IoT devices to be controlled locally and remotely and to communicate measured data. To control the IoT devices or communicate the measured data, a client-based configuration, authentication among the IoT devices, and protocol binding may be performed between each of the IoT devices.

Some IoT devices may provide useful information for the public. However, to access the useful information, the client-based configuration, the authentication among the IoT devices, and the protocol binding may be required. These requirements limit access to the useful information by the public.

Accordingly, some embodiments described in the current disclosure enable access to public information by the public. The public information may be made available to the public based on a location of a mobile device seeking access to the public information. The public information may then be processed by an application on the mobile device. Access to the public information is allowed without the client-based configuration, the authentication, and the protocol binding required to control an IoT device or access private information.

Some embodiments include an open public IoT (OP-IoT) device. The OP-IoT device is configured to communicate private information. To communicate the private information, client-based configuration, authentication, and protocol binding may occur between a registered device and the OP-IoT device. The OP-IoT device may also be configured to communicate public information to a mobile device based on a distance between the OP-IoT device and the mobile device. Communication of the public information may be performed without client-based configuration, authentication, and protocol binding. The public information may be configured in a raw form or a generic form. The mobile device may receive the public information and process the public information locally and return results. In addition, the mobile device may process the public information using a Web-of-Things (WoT) standard format.

The mobile device may be able to search for and discover one or more OP-IoT devices that are within a particular proximity of the mobile device. In some embodiments, the mobile device may detect or receive a broadcast location of the OP-IoT device, which may indicate that the OP-IoT device is within a particular proximity of the mobile device. In some embodiments, the mobile device may communicate its location to a cloud server. The cloud server may communicate information or data related to one or more OP-IoT devices that are within the particular proximity. The mobile device may then request the public information from the detected OP-IoT device(s). The mobile device may then retrieve or receive the public information, which may be processed to generate a result without requiring any configuration and authentication.

These and other embodiments are described with reference to the appended Figures in which like item number indicates like function and structure unless described otherwise.

FIG. 1 depicts a block diagram of an example Open Public Internet-of-Things (OP-IoT) system 100 in which one or more embodiments may be implemented. The OP-IoT system 100 may include an IoT on which private information and public information may be communicated. The private information may be communicated between an IoT device 102, an OP-IoT device 110, and a registered device 108. The registered device 108 may be authorized to communicate the private information with the IoT device 102 and the OP-IoT device 110. For instance, a client-based configuration, an authentication, and a protocol binding may be performed between the registered device 108 and the IoT device 102 and the OP-IoT device 110.

In addition, the OP-IoT device 110 may be configured to communicate public information with a mobile device 130. No client-based configuration, authentication, or protocol binding may be performed between the OP-IoT device 110 and the mobile device 130. Instead, in the OP-IoT system 100, the public information may be communicated based on a distance between the OP-IoT device 110 and the mobile device 130.

Communication of the public information may overcome a current technical limitation of the IoT device 102. In particular, the IoT device 102 may only be configured to communicate private information to the registered device 108. Additionally, communication of the private information to the registered device 108 is performed following performance of client-based configuration, authentication, and protocol binding between the registered device 108 and the IoT device 102.

The OP-IoT device 110 provides a technical solution to the limitation of the IoT device 102. The OP-IoT device 110 may be configured to communicate the private information to the registered device 108 following the performance of client-based configuration, authentication, and protocol binding between the registered device 108 and the OP-IoT device 110. In addition, the OP-IoT device 110, may be configured to communicate public information to the mobile device 130 without performing the client-based configuration, the authentication, or the protocol binding between the mobile device 130 and the OP-IoT device 110.

A benefit of the OP-IoT device 110 in the OP-IoT system 100 may include dissemination of useful public information to the mobile device 130 without a specific association between the mobile device and the OP-IoT device 110. The mobile device 130 may then process the public information to obtain a result. For instance, the OP-IoT device 110 may be configured to measure light. Private information regarding the light may be communicated to the registered device 108. Additionally, public information may be communicated to the mobile device 130 when the mobile device 130 is within a particular proximity of the OP-IoT device 110. The mobile device 130 may thus have pertinent information to an area surrounding the OP-IoT device 110.

The OP-IoT system 100 may include a cloud server 115, a provider database 111, the IoT device 102, the registered device 108, the mobile device 130, and the OP-IoT device 110. The cloud server 115, the provider database 111, the IoT device 102, the registered device 108, the mobile device 130, and the OP-IoT device 110 may be configured to communicate data and information via a communication network (network) 124. Each of the cloud server 115, the provider database 111, the IoT device 102, the registered device 108, the mobile device 130, the OP-IoT device 110, and the network 124 are described below.

The network 124 may include any communication network configured for communication of signals between any of the components (e.g., 102, 108, 110, 111, 115, and 130) of the OP-IoT system 100. The network 124 may be wired or wireless. The network 124 may have numerous configurations including a star configuration, a token ring configuration, or another suitable configuration. Furthermore, the network 124 may include a local area network (LAN), a wireless personal area network (WPAN), a wireless LAN (WLAN), a wide area network (WAN) (e.g., the Internet), and/or other interconnected data paths across which multiple devices may communicate. In some embodiments, the network 124 may include a peer-to-peer network. The network 124 may also be coupled to or include portions of a telecommunications network that may enable communication of data in a variety of different communication protocols.

In some embodiments, the network 124 includes or is configured to include a BLUETOOTH® communication network, a Z-Wave® communication network, an Insteon® communication network, an EnOcean® communication network, a Wi-Fi communication network, a ZigBee communication network, a HomePlug communication network, a Power-line Communication (PLC) communication network, a message queue telemetry transport (MQTT) communication network, an MQTT-sensor (MQTT-S) communication network, a constrained application protocol (CoAP) communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 124 may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other protocol that may be implemented in the OP-IoT system 100.

The provider database 111 may include any memory or data storage, which may be similar to memory 712 described elsewhere in the present disclosure. The provider database 111 may include network communication capabilities such that other components in the OP-IoT system 100 may communicate with the provider database 111.

The provider database 111 may be store one or more data structures that may be used by the mobile device 130 to process public information. For example, the provider database 111 may store or otherwise make available one or more types of schema that may be used to process the public information. In some embodiments, the provider database 111 may be associated with an entity that is associated with the OP-IoT device 110. The entity may provide schema for use with the public information communicated by the OP-IoT device 110. The schema may be unique for the OP-IoT device 110, may be unique to a device type of the OP-IoT device 110, or may be a generalized or unified schema that is configured to work with the public information of the OP-IoT device 110 as well as one or more other OP-IoT devices.

The mobile device 130 may receive the public information. The mobile device 130 may access or retrieve the schema or another data structure from the provider database 111. The mobile device 130 may use the schema to process the public information.

The registered device 108 may include any computer-based or hardware-based computing system. The registered device 108 may be configured to communicate data and information with the components of the OP-IoT system 100. The registered device 108 may be configured to communicate private information with the IoT device 102 and/or the OP-IoT device 110.

The registered device 108 may include a device private information module 109. The device private information module 109 may be configured to authenticate the registered device 108, to communicate the private information, to process the private information, or some combination thereof. For instance, the device private information module 109 may communicate data and information with the OP-IoT device 110 and/or the IoT device 102 to establish a connection via which the private information may be communicated. Additionally, the device private information module 109 may receive the private information and process the private information to generate a result.

The device private information module 109, one or more components or modules thereof, and other modules (e.g., 103, 106, 105, 104, and 107) described throughout the present disclosure may be implemented using hardware including a processor, a microprocessor (e.g., to perform or control performance of one or more operations), a field-programmable gate array (FPGA), or an application-specific integrated circuit (ASIC). In some other instances, the device private information module 109 may be implemented using a combination of hardware and software. Implementation in software may include rapid activation and deactivation of one or more transistors or transistor elements such as may be included in the hardware of a computing system (e.g., the device private information module 109). Additionally, software defined instructions may operate on information within transistor elements. Implementation of software instructions may at least temporarily reconfigure electronic pathways and transform computing hardware.

In some embodiments, the registered device 108 may include another IoT device. For example, the registered device 108, the OP-IoT device 110, and the IoT device 102 may exchange private information in an IoT system.

The IoT device 102 may include any IoT device. The IoT device 102 may include a computer-based or hardware-based computing system. The IoT device 102 may be configured to communicate data and information with the components of the OP-IoT system 100. The IoT device 102 may include a private information module 103 that is configured to interface with the registered device 108 and to exchange private information with the registered device 108. For example, the private information module 103 and the device private information module 109 may be configured to perform a client-based configuration, an authentication, a protocol binding, or some combination thereof. Performance of the client-based configuration, the authentication, the protocol binding, or some combination thereof may enable communication of the private information between the IoT device 102 and the registered device 108 via the network 124.

The IoT device 102 may be configured to only communicate private information with the registered device 108 or another IoT device that has been authenticated, configured (e.g., the client-based configuration), and protocol bound. The private information of the IoT device 102 is not available to the mobile device 130 because the mobile device 130 has not been authenticated and configured with the IoT device 102. The private information may be configured for specific processing by the registered device 108. For example, the private information may be formatted, structured, organized, etc., such that the registered device 108 understands the private information.

The mobile device 130 may include a computer-based or a hardware-based computing system. The mobile device 130 may be configured to communicate data and information with the components of the OP-IoT system 100. For example, the mobile device 130 may be configured to communicate with the provider database 111, the cloud server 115, and the Op-IoT device 110.

In some embodiments, the mobile device 130 may include a device public information module 106. The device public information module 106 may be configured to retrieve or obtain schema or data structures from the provider database 111. Additionally, the device public information module 106 may be configured to communicate with the cloud server 115. For instance, the device public information module 106 may be configured to communicate a location of the mobile device 130 with the cloud server 115. The mobile device 130 may include a smart phone, a vehicle, a robot, a machine, an aerial drone, or another mobile device.

In these and other embodiments, the device public information module 106 may be configured to receive data and information related to the OP-IoT device 110 and/or public information from the cloud server 115. For instance, the cloud server 115 may communicate a location, a unique key, a network address, or some combination thereof of the OP-IoT device 110. The network address may include an Internet Protocol (IP address) such as an IPv6. Throughout the remaining portions of the present disclosure, the network address of the OP-IoT device 110 is referred to as IPv6. Use of IPv6 is not meant to be limiting. In some embodiments another network address may be used.

Additionally, in some embodiments the device public information module 106 may be configured to communicate public information with the OP-IoT device 110. For instance, the device public information module 106 may communicate a request for the public information and receive the public information directly from the OP-IoT device 110.

The cloud server 115 may include a hardware-based server. The cloud server 115 may be configured to communicate data and information with the components of the OP-IoT system 100. The cloud server 115 may include a cloud server public information module 107. In some embodiments, the OP-IoT device 110 may be configured to communicate an embedded location, a unique key, and an IPv6 to the cloud server public information module 107. The embedded location, the unique key, and the IPv6 may be communicated in a registration request. The cloud server public information module 107 may register the OP-IoT device 110. Additionally, in these and other embodiments, the cloud server public information module 107 may receive an access request from the mobile device 130 along with a location of the mobile device 130. In response, the cloud server public information module 107 may communicate the unique key and IPv6 to the mobile device 130. The cloud server public information module 107 may communicate the unique key and IPv6 to the mobile device 130 in response to the mobile device 130 being within a particular proximity (e.g., 10 meters). The mobile device 130 may communicate an access request to the OP-IoT device 110 using the unique key and the IPv6. The OP-IoT device 110 may reply to the access request with the public information.

Additionally or alternatively, the cloud server public information module 107 may be configured to receive public information. The cloud server public information module 107 may communicate the public information to the mobile device 130 in response to a request.

The OP-IoT device 110 may include a computer-based or a hardware-based computing system. The OP-IoT device 110 may be configured to communicate data and information with the components of the OP-IoT system 100. The OP-IoT device 110 may include a private information module 105 and a public information module 104.

The private information module 105 may be configured to function substantially similarly to the private information module 103 of the IoT device 102. For example, the IoT device 102 and OP-IoT device 110 may be configured to communicate private information. The private information may be communicated with the registered device 108 that is authenticated and configured to interface with the IoT device 102 and OP-IoT device 110. For example, in IoT systems, which may be included in the OP-IoT system 100, the registered device 108 may communicate commands to the IoT device 102 and OP-IoT device 110. The commands may change a state or condition of the IoT device 102 and OP-IoT device 110. In addition, the IoT device 102 and OP-IoT device 110 may measure, monitor, or sense a physical phenomenon. The IoT device 102 and OP-IoT device 110 may then configure or structure data representative of the measured physical phenomenon. The IoT device 102 and OP-IoT device 110 may communicate the data representative of the measured physical phenomenon as private information to the registered device 108.

In addition, the OP-IoT device 110 and the public information module 104 may be configured to communicate public information to the mobile device 130. The mobile device 130 may not be authenticated or configured to interface with the OP-IoT device 110. For example, the mobile device 130 may be unassociated with the OP-IoT device 110. The public information may include data representative of the measured physical phenomenon. The public information may be communicated in a raw form or general form of the data representative of the measured physical phenomenon.

In some embodiments, the OP-IoT device 110 may be configured to communicate or enable retrieval of the public information directly with the mobile device 130. For example, the OP-IoT device 110 may be configured to measure a physical phenomenon by a physical sensor. Additionally, the OP-IoT device 110 may be configured to measure an embedded location of an OP-IoT device using an embedded locational sensor.

In embodiments in which there is direct communication between the mobile device 130 and the OP-IoT device 110, the public information module 104 may broadcast the IPv6 and/or the embedded location. The mobile device 130 may read or detect the broadcast IPv6 and/or the embedded location. In response to such detection, the mobile device 130 may request access to the public information. The OP-IoT device 110 may establish, without authentication or configuration, a communicative connection with the mobile device 130 in response to the mobile device 130 being within a particular proximity to the OP-IoT device 110 and/or the request sent from the mobile device 130. In response to presence of the mobile device 130 within the particular proximity, the OP-IoT device 110 allows access to the public information in a raw form via the network 124. In some embodiments, broadcast of the IPv6 and the embedded location may be communicated using a first communication protocol that is different from a second communication protocol via which the private information and the public information are communicated on the network 124. The first communication protocol may include a low BLUETOOTH® v5. The second communication protocol may include a WLAN protocol or a WPAN protocol, for instance.

In some embodiments, direct communication between the mobile device 130 and the OP-IoT device 110 may be controlled through a configuration of an air interface. For instance, a Wi-Fi interface may be set to public, which may enable communication without an authentication between the mobile device 130 and the OP-IoT device 110. In addition, the air interface may be configured to prevent or to not connect to the Internet such that the mobile device 130 may only access the air interface within the particular proximity of the OP-IoT device 110. Additionally, still, certain public information may be associated via the air interface and may thus a local and public air interface may limit access to the public information (e.g., the IPv6 and the embedded location).

In some embodiments, the public information module 104 may be installed in the IoT device 102. For example, the public information module 104 may include a software or a hardware solution that may be installed in an existing IoT device 102 that is incapable of communicating the public information. Following installation of the public information module 104, the IoT device 102 may have the capabilities of the OP-IoT device 110.

Some examples of the OP-IoT system 100 may include a city, a town, or an apartment complex that enables citizens or tenants to access the public information. The public information may be provided by city government as part of infrastructure of a smart city for the citizens. Additionally, the OP-IoT system 100 may include a private industry that may take advantages of analyzing and archiving the public information. For instance, the private company may offer the public information and/or add a service to the public information.

In addition, the OP-IoT system 100 may include a machine network of robots, drones, driverless cars, or another machine. The machine network may use the OP-IoT devices 110 to understand environmental conditions as the machines move from one area to another area. For instance, the public information may include an indication that an area is a no horn blowing area, a restricted area, or a safe area for machines. Additionally or alternatively, the public information may indicate available parking locations, location of charging stations, and the like. Additionally, the machine network may include OP-IoT devices 110 which may communicate public information (e.g., pollution conditions) as the machines move.

Modifications, additions, or omissions may be made to the OP-IoT system 100 without departing from the scope of the present disclosure. For example, the OP-IoT system 100 may include one or more IoT devices 102, one or more OP-IoT devices 110, one or more registered devices 108, one or more mobile devices 130, one or more cloud servers 115, one or more provider databases 111, or any combination thereof. Moreover, the separation of various components and servers in the embodiments described herein is not meant to indicate that the separation occurs in all embodiments. For example, the provider database 111 may be integrated with the cloud server 115. Moreover, it may be understood with the benefit of this disclosure that the described components and servers may generally be integrated together in a single component or server or separated into multiple components or servers.

Figure 2:
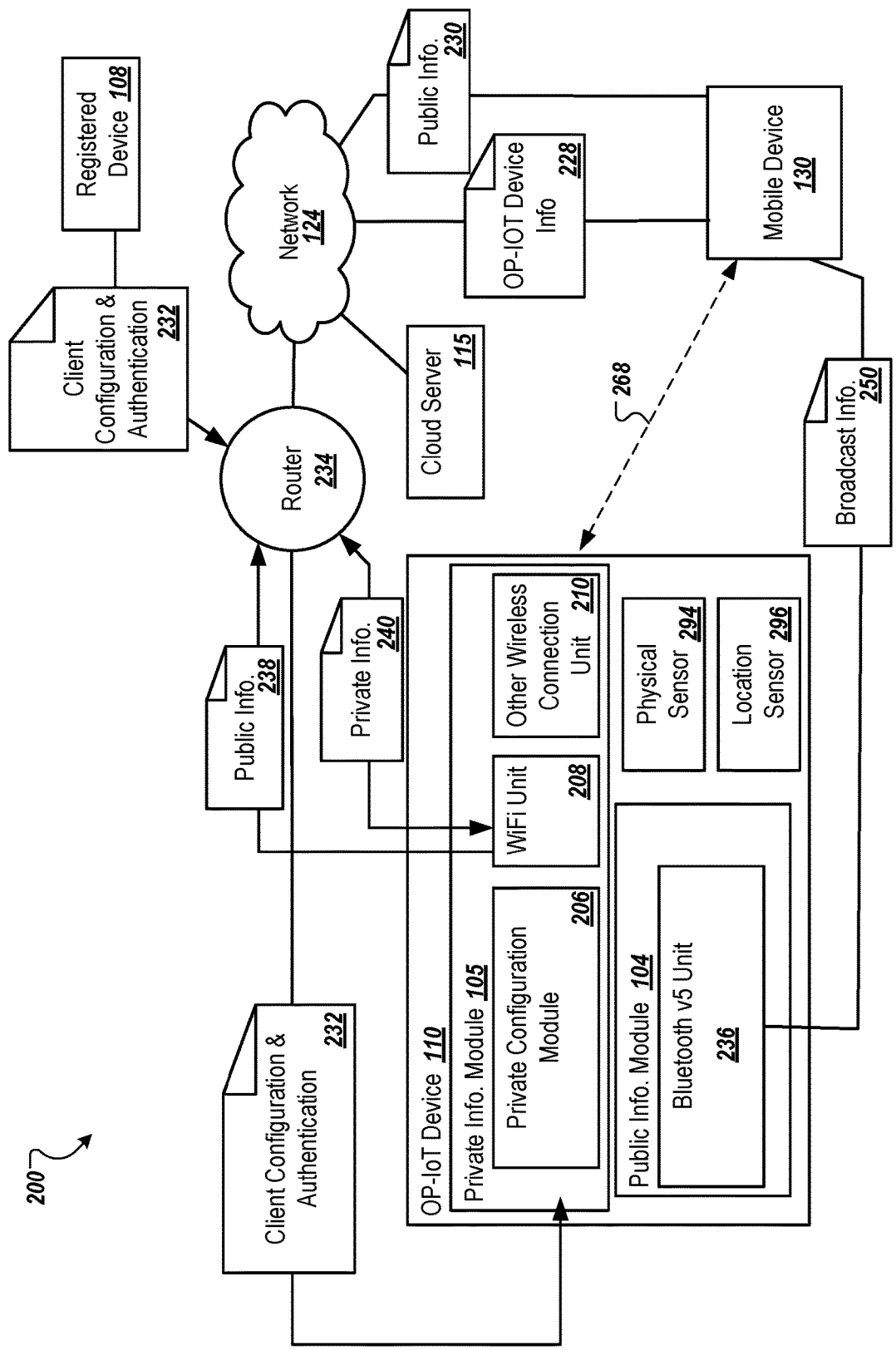
FIG. 2 illustrates an example information communication process that may be implemented in the operating environment of FIG. 1.

FIG. 2 illustrates an example information communication process (communication process) 200 that may be implemented in the OP-IoT system 100 of FIG. 1. For example, the communication process 200 may be performed at least in part by the OP-IoT device 110. The communication process 200 may involve the registered device 108, the cloud server 115, the network 124, and the mobile device 130, some details of which are provided with reference to FIG. 1. The communication process 200 may include communication of private information 240 and communication of public information 238 and 230 by the OP-IoT device 110.

Although, not explicitly depicted in FIG. 2, the OP-IoT device 110 may include the IoT device 102 with the public information module 104 installed therein. For example, the public information module 104 may include a software or a hardware solution that may be installed in an existing IoT device 102 that prior to such installation is incapable of communicating the public information.

In FIG. 2, the OP-IoT device 110 may include a physical sensor 294, a locational sensor 296, the private information module 105, and the public information module 104. The physical sensor 294 may be configured to measure or detect a physical phenomenon in the environment or surrounding of the OP-IoT device 110. Some examples of the physical sensor 294 may include a brightness sensor, a dust concentration sensor, a temperature sensor, a humidity sensor, a wind sensor, a carbon monoxide sensor, a carbon dioxide sensor, an acoustic sensor, an air pollution sensor, a soil sensor, a pressure sensor, a traffic light status sensor, a locational sensor related to a phenomenon, a magnetic field sensor, a radiation sensor, a solar sensor, an alarm sensor, a biometric sensor, a precipitation sensor, a vehicle detector, a liquid level sensor, an air flow sensor, a water temperature sensor, a seat occupancy sensor, a WiFi sensor, and a geographic sensor.

The locational sensor 296 may determine an embedded location of the OP-IoT device 110. An example of the locational sensor 296 may include a global positioning system (GPS) sensor, an indoor positioning sensor (IPS) that may base a location of the OP-IoT device 110 on a measured radio wave, magnetic field, WiFi strength, etc., an acoustic sensor, or another suitable locational sensor 296. In some embodiments, the locational sensor 296 may be omitted. In these and other embodiments, an embedded location of the OP-IoT device 110 may be determined through another device and input to the OP-IoT device 110.

The embedded location and data representative of a measured physical phenomenon may be communicated to the public information module 104. The data representative of the measured physical phenomenon may be communicated to the private information module 105.

The communication of the private information 240 may be performed by the private information module 105. The private information module 105 may include a private configuration module 206, a WiFi unit 208, another wireless connection unit 210, or some combination thereof.

The registered device 108 may communicate a client configuration and authentication information 232 to a router 234. The router 234 may direct the client configuration and authentication information 232 to the OP-IoT device 110. The private configuration module 206 may receive the configuration and authentication information 232 and authenticate and configure the registered device 108 relative to the OP-IoT device 110.

After the registered device 108 is authenticated and configured, the private information module 105 may establish a communication channel between the OP-IoT device 110 and the registered device 108. The registered device 108 may communicate an access request for the private information 240. The private information module 105 may determine a context of the private information 240 communicated with the registered device 108. The private information 240 may be communicated between the registered device 108 and the private information module 105 via the communication channel.

The private information 240 may include the data representative of the measured phenomenon or some derivative thereof. The measured phenomenon may be measured in an environment surround the IoT device 110 and may be formatted in a particular way that enables the registered device 108 to process the private information 240. Some examples of the measured physical phenomenon may include one or more of light, presence and/or concentration of dust, a thermal condition, humidity, wind or a characteristic (e.g., velocity) thereon, carbon monoxide, carbon dioxide, presence and/or characteristics (e.g., frequencies, amplitude, etc.), sound, presence and/or concentration of one or more pollutants, characteristics of soil, atmospheric pressure, hydraulic pressure, traffic conditions (e.g., rate of speed, delay due to traffic, state of a traffic light, etc.), a characteristic of the phenomenon (e.g., crowds, etc.), presence of or characteristics of a magnetic field, presence of or characteristics of some form of radiation (e.g., gamma rays or intensity thereof), solar intensity, a state of an alarm, a physiological characteristic (e.g., heart rate, skin perspiration, blood oxygen levels, blood pressure, etc.), presence of or characteristics (velocity, operating condition, etc.), of a vehicle, an amount of liquid, an air flow rate, whether a seat is occupied, presence of or characteristics of a WiFi signal or bandwidth thereof, a location, and the like. Accordingly, the private information may include, for example, data that is representative of one or more of the measured physical phenomenon.

In addition, the private information 240 may also include a command and/or a response that are communicated between the registered device 108 to the OP-IoT device 110. The commands may alter a state, a control setting, or condition of the OP-IoT device 110 and/or provide a status of the IoT device 110.

In FIG. 2, the private information 240 may be communicated using the WiFi unit 208 and the router 234. In other embodiments, the private information 240 or some portion thereof may be communicated via another wireless protocol using the other wireless connection unit 210. In these and other embodiments, the private information 240 or some portion thereof may be communicated via a communication channel established in the network 124.

In addition, public information 238 and 230 may be communicated by the OP-IoT device 110. The public information 238 and 230 may be communicated to or made available to the mobile device 130 based on a particular proximity 268 between the OP-IoT device 110 and the mobile device 130. The communication process 200 may include a peer-to-peer (P2P) public information communication process in which the public information 238 is directly communicated between the mobile device 130 and the OP-IoT device 110. The communication process 200 may also include a peer-to-cloud (P2C) public communication process in which the public information 230 is communicated between the OP-IoT device 110 and the mobile device 130 using the cloud server 115.

In the P2P public information communication process, a BLUETOOTH v5 unit 236 of the public information module 104 may be configured to broadcast information 250. In some embodiments, the information broadcast by the BLUETOOTH v5 unit 236 may include the embedded location and a network address (e.g., IPv6 address) of the OP-IoT device 110. The OP-IoT device 110 may utilize BLUETOOTH v5 because this protocol is a low energy protocol that allows for communication with multiple devices (e.g., the mobile device 130) with relatively low energy consumption. In other embodiments, another communication protocol may be utilized to broadcast the embedded location and the network address.

When the mobile device 130 is within the particular proximity 268, the mobile device 130 may be configured to detect the OP-IoT device 110 based on the broadcast information 250. The mobile device 130 may communicate an access request to the OP-IoT device 110, which may be configured to request the public information 238. A public information module 104 may determine the public information 238 and communicate the public information 238 to the mobile device 130. In the embodiment depicted in FIG. 2, the public information is communicated to the mobile device 130 via the router 234 using the WiFi unit 208. In other embodiments, the public information may be communicated using the other wireless connection unit 210 or the BLUETOOTH v5 unit 236.

The public information 238 may include the data representative of the measured physical phenomenon or some derivative thereof. A list of some example physical phenomenon is provided elsewhere in the present disclosure. The public information 238 may be similar to the private information 240, except that the public information 238 may be formatted in a generic or a raw form. The generic or the raw form of the data representative of the measured physical phenomenon may be used by the mobile device 130 that is not specifically configured to work with the OP-IoT device 110. An example of the public information 238 may include a series of lighting conditions presented in a JSON file.

In the P2C public communication process, the OP-IoT device 110 may communicate the broadcast information 250 (e.g., the embedded location and the IPv6) along with a unique key to the cloud server 115. The cloud server 115 may register the OP-IoT device 110 using the broadcast information 250 and the unique key. The mobile device 130 may communicate its location to the cloud server 115. The cloud server 115 may determine whether the mobile device 130 is within the particular proximity 268 of the OP-IoT device 110. For instance, the cloud server 115 may compare the location of the mobile device 130 with the embedded location registered for the OP-IoT device 110. In response to the mobile device 130 being within the particular proximity 268 of the OP-IoT device 110, the cloud server 115 may communicate OP-IoT device information 228 to the mobile device 130. The OP-IoT device information 228 may include the network address (IPv6) and unique key of the OP-IoT device 110. The mobile device 130 may communicate an access request to the OP-IoT device 110. The access request may include the network address and the unique key. In response, the public information 238 may be communicated to the mobile device 130 or retrieved by the mobile device 130.

Additionally, in some embodiments, the public information 238 may be communicated to the cloud server 115. In response to the mobile device 130 being within the particular proximity 268 of the OP-IoT device 110, the cloud server 115 may communicate public information 230 to the mobile device 130.

Figure 3:
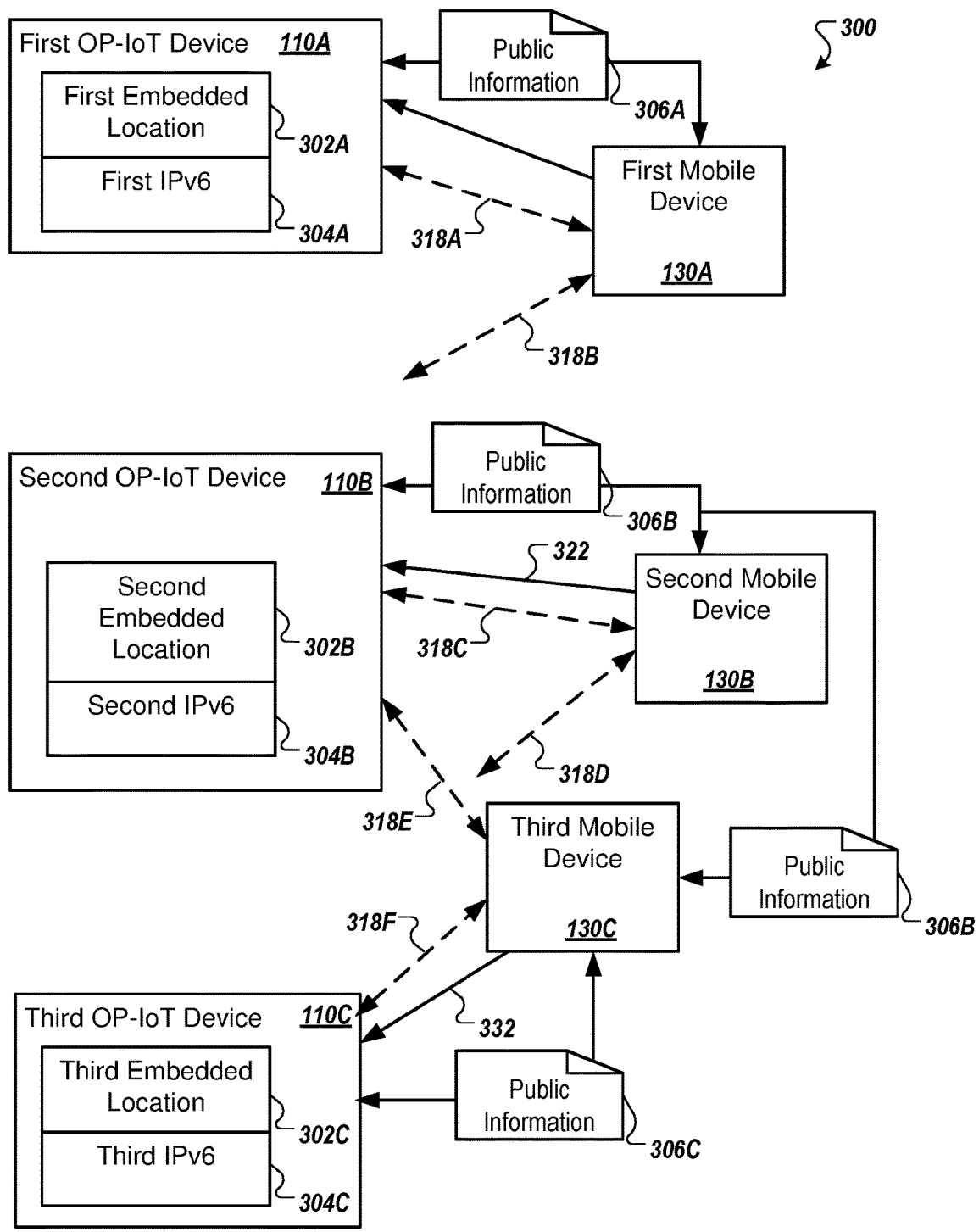
FIG. 3 illustrates an example peer-to-peer (P2P) public information communication process that may be implemented in the operating environment of FIG. 1.

FIG. 3 illustrates an example peer-to-peer (P2P) public information communication process 300 that may be implemented in the OP-IoT system 100 of FIG. 1. In FIG. 3, three OP-IoT devices 110A-110C (generally, OP-IoT device 110 or OP-IoT devices 110) are depicted with three mobile devices 130A-130C (generally, mobile device 130 or mobile devices 130). The three OP-IoT devices 110 may be substantially similar to the OP-IoT device 110 described with reference to FIGS. 1 and 2. Additionally, in some embodiments, one or more of the OP-IoT devices 110 may include an IoT device with a public information module (e.g., 104) installed therein. For example, the public information module may include a software or a hardware solution that may be installed in the IoT device that prior to such installation is incapable of communicating the public information.

Each of the three OP-IoT devices 110 may include an embedded location 302A-302C (embedded location 302 or embedded locations 302). Additionally, each of the three OP-IoT devices 110 may include an IPv6 304A-304C (IPv6s 304 or IPv6 304). The embedded locations 302 may include an indoor location in some embodiments or may include another type of location (e.g., longitude/latitude/elevation, distance from particular feature, etc.). The IPv6 304 may provide an identification and a location system for the OP-IoT devices 110 on a network (e.g., the network 124 of FIG. 1). The IPv6 304 may be used to route traffic (e.g., the public information and requests for the public information) in the network.

In some embodiments, the embedded locations 302 may be measured by an embedded locational sensor (not shown in FIG. 3). For example, the OP-IoT devices 110 may include or may be coupled to an embedded locational sensor such as a global positioning system (GPS) sensor. In other embodiments, the embedded locations 302 may be measured by another locational sensor, input by another system, input by an operator, or some combination thereof.

The OP-IoT devices 110 may be configured to broadcast the embedded locations 302 and the IPv6s 304. In some embodiments, the OP-IoT devices 110 may be configured to broadcast the embedded locations 302 and the IPv6s 304 using a low energy communication protocol. Examples of the low energy communication protocol may include BLUETOOTH® v5 or BLUETOOTH® low energy (BLE).

In some embodiments, the OP-IoT devices 110 may be fixed or substantially fixed at the embedded location 302 at least during communication or retrieval of the public information 306A-306C (generally, public information 306). Fixed, as used to describe the embedded locations 302, may indicate that the embedded locations 302 may not change, but does not indicate that the OP-IoT devices 110 are not in motion. For instance, the OP-IoT devices 110 may be mounted in a moving vehicle. The embedded location 302 may include the position of the OP-IoT 110 in the vehicle, which may not change relative to the vehicle. However, the OP-IoT device 110 and the vehicle may be in motion.

The mobile devices 130 may move relative to one or more of the OP-IoT devices 110. Communication of the public information 306 may occur responsive to positions of the mobile devices 130 relative to the OP-IoT devices 110. For example, in response to the mobile devices 130 being within a particular proximity 318A-318F (generally, particular proximity 318) of one or more of the OP-IoT devices 110, the public information 306 may be accessed from one or more of the OP-IoT devices 110.

The mobile devices 130 may be configured to receive the broadcast embedded locations 302 and the IPv6s 304. The mobile devices 130 may accordingly discover the mobile devices 130 that are within the particular proximity 318. The mobile devices 130 may request the public information 306 from the OP-IoT devices 110 that are within the particular proximity 318.

The OP-IoT devices 110 may communicate the public information 306 directly with the mobile devices 130. For example, the OP-IoT devices 110 may communicate the public information 306 directly with the mobile devices 130 in response to the mobile devices 130 being within the particular proximity 318 and/or responsive to a request from the mobile devices 130.

For example, the first mobile device 130A may move such that the first mobile device 130A is within a first particular proximity 318A of the first OP-IoT device 110A. In response to presence of the first mobile device 130A being within the particular proximity 318, the first OP-IoT device 110A may be discoverable by the first mobile device 130A based on a broadcast of the embedded locations 302 and the IPv6s 304 of the first OP-IoT device 110A. The first mobile device 130A may request a first public information 306A of the first OP-IoT device 110A. The request for the first public information 306A may include the embedded locations 302 and the IPv6s 304 that is broadcast by the first OP-IoT device 110A.

The first OP-IoT device 110A may be configured to allow access to or communicate the first public information 306A of the first OP-IoT device 110A. The first OP-IoT device 110A is configured to directly communicate to or enable direct retrieval of the first public information 306A via a communication network (e.g., 124 of FIG. 1). The first public information 306A is configured to be locally processed on the first mobile device 130A.

The first OP-IoT device 110A may however be outside of a second particular proximity 318B of the second OP-IoT device 110B. Accordingly, the first mobile device 130A may be unable to detect the second OP-IoT device 110B and/or unable to receive a second public information 306B of the second OP-IoT device 110B.

In some embodiments, a communicative connection may be established between the first OP-IoT device 110A and the first mobile device 130A. The first public information 306A may be communicated via the communicative connection between the first OP-IoT device 110A and the first mobile device 130A. The communicative connection may be established in a communication network such as the network 124 described with reference to FIG. 1. The communicative connection may enable communication via a second communication protocol, which may be different from a first communication protocol on which the embedded location 302 and the IPv6 304 is broadcast. The second communication protocol may include a wireless local area network (WLAN) and/or wireless personal area network (WPAN) protocol.

The communicative connection may be established without authentication or configuration between the first mobile device 130A and the first OP-IoT device 110A. For example, the first mobile device 130A may not provide an identifier of the first mobile device 130A or a user associated therewith. Additionally, the mobile device 130A may not include an application that is specifically configured to modify or change the first OP-IoT device 110A or a condition or state thereof. Instead, in some embodiments the first public information 306A may be communicated solely based on the position of first mobile device 130A relative to the first OP-IoT 110A and a request that includes the broadcast embedded location 302 and the IPv6 304.

Additionally, in some embodiments, one or more subsequent instances in which the first mobile device 130A is within the first particular proximity 318A of the first OP-IoT device 110A, the first public information 306A or updates thereto may be again accessed by the first mobile device 130A.

The mobile devices 130 may be configured to receive public information 306 from two or more OP-IoT devices 110. For example, the third mobile device 130C may move such that the third mobile device 130C is within a fifth particular proximity 318E of the second OP-IoT device 110B and within a sixth particular proximity 318F of the third OP-IoT device 110C.

When the third mobile device 130C is within the fifth particular proximity 318E of the second OP-IoT device 110B and within the sixth particular proximity 318F of the third OP-IoT device 110C, the third mobile device 130C may discover the second OP-IoT device 110B and the third OP-IoT device 110B. The third mobile device 130C may then communicate a request to each of the second OP-IoT device 110B and the third OP-IoT device 110B for a second public information 306B and a third public information 306C. The request communicated to the second OP-IoT device 110B may include a second embedded location 302B and a second IPv6 304B broadcast by the second OP-IoT device 110B. Similarly, the request communicated to the third OP-IoT device 110B may include a third embedded location 302C and a third IPv6 304C broadcast by the third OP-IoT device 110C.

In response to presence of the third mobile device 130C being positioned within the fifth particular proximity 318E and/or the request, the second OP-IoT device 110B may be configured to allow access to or may communicate the second public information 306B of the second OP-IoT device 110B. In response to presence of the third mobile device 130C being positioned within the sixth particular proximity 318F and/or the request, the third OP-IoT device 110C may be configured to allow access to or may communicate the third public information 306C of the third OP-IoT device 110C.

The particular proximities 318 may vary based on the content of the public information 306. For instance, the public information 306 may include localized data (e.g., light or temperature of a portion of a room). Thus, the particular proximities 318 related to the public information 306 may be a few (e.g. 2 or 3) meters. Additionally, the OP-IoT device 110 may set the particular proximities 318. By setting the particular proximities 318 to a particular range, instance of unauthorized access may be limited. For instance, the particular proximities 318 may be set to a range within a building. Accordingly, mobile devices 130 within the building may request and receive the public information 306. However, mobile devices 130 outside the building may not be within the particular proximities 318. Thus, access to the public information 306 may be limited. Additionally still, the first communication protocol on which the embedded location 302 and the IPv6 304 are broadcast may limit the particular proximities 318. For instance, in embodiments in which the first communication protocol is BLUETOOTH v5, the particular proximities 318 may be in the tens of meters (e.g., about 10 meters).

Figure 4:
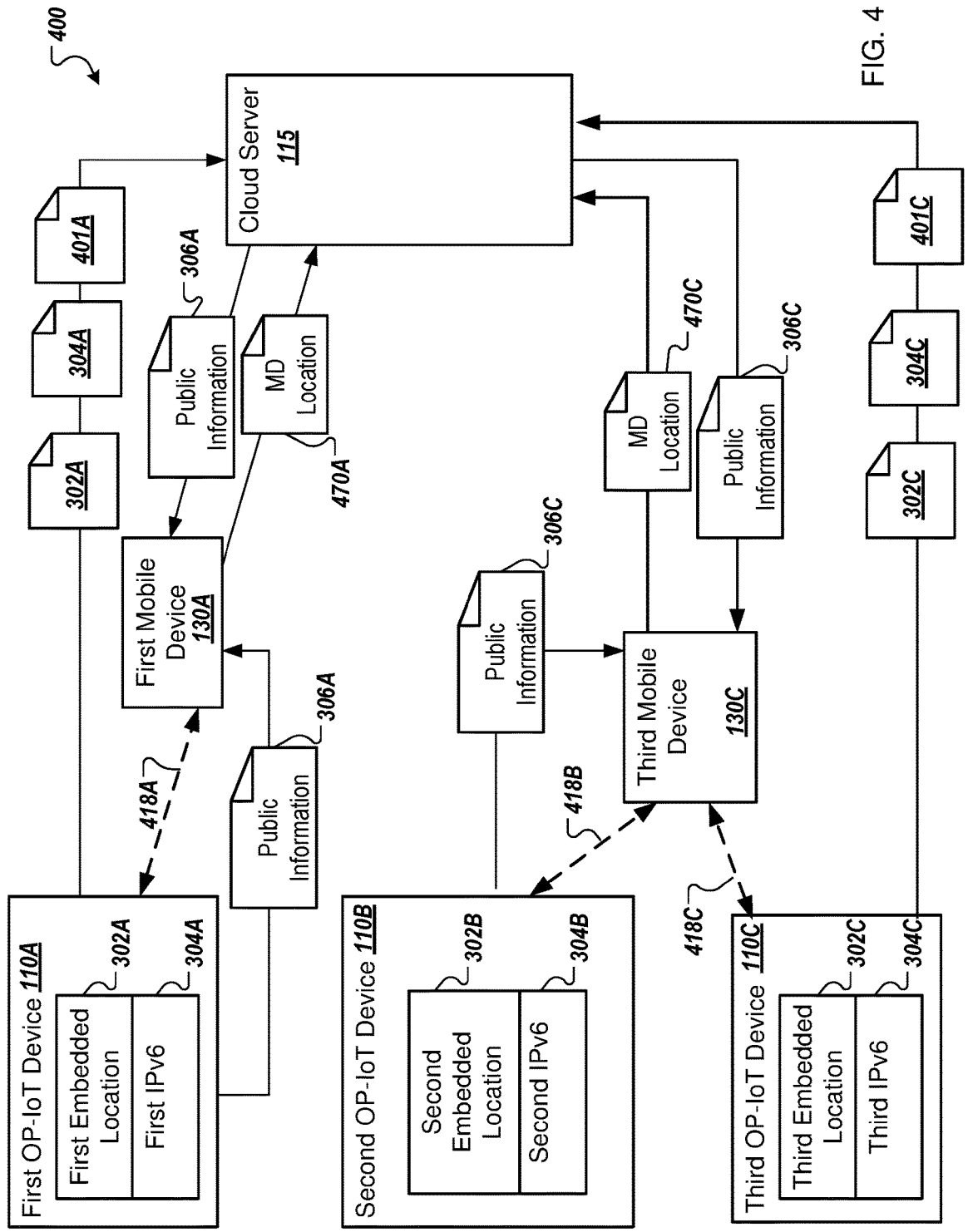
FIG. 4 illustrates an example peer-to-cloud (P2C) public information communication process (P2C process) that may be implemented in the operating environment of FIG. 1.

FIG. 4 illustrates an example peer-to-cloud (P2C) public information communication process (P2C process) 400 that may be implemented in the OP-IoT system 100 of FIG. 1. FIG. 4 includes the OP-IoT devices 110 and the first and the third mobile devices 130A and 130C of FIG. 3. The OP-IoT devices 110 include the embedded locations 302 and the IPv6s 304 of FIG. 3. In FIG. 4, the cloud server 115 is also depicted. Communication of the public information 306 in the P2C process 400 involves the cloud server 115.

In the P2C process 400, the OP-IoT devices 110 may be configured to communicate the embedded locations 302 and the IPv6s 304 to the cloud server 115. Communication of the embedded locations 302 and the IPv6s 304 may be included in a registration request. Communication of the registration request and/or embedded locations 302 and the IPv6s 304 may be via a communication network, which may support a WLAN protocol and/or a WPAN protocol.

In addition, to the embedded locations 302 and the IPv6s 304, the OP-IoT devices 110 may communicate a unique key 401A and 401C (generally, key 401 or keys 401). The key 401 may be unique to one of the OP-IoT devices 110. The keys 401 may be configured to enable access to the public information 306. The keys 401 may include an alphanumeric key in some embodiments. Again, the keys 401 may be communicated in the registration request. The registration request may enable the cloud server 115 to develop a locational database regarding locations of OP-IoT devices 110.

The mobile devices 130 may be configured to communicate locational information (hereinafter, "MD locations 470A and 470C") to the cloud server 115. The MD locations 470A and 470C may be included in an access request. Based on the received MD locations 470A and 470C and the embedded locations 302, the cloud server 115 may determine or find one or more of the OP-IoT devices 110 that are within particular proximities 418A-418C (generally, particular proximity 418 or particular proximities 418) of the mobile devices 130.

In some embodiments, the cloud server 115 may communicate the keys 401 and the IPv6s 304 of the OP-IoT devices 110 that are within the particular proximities 418 of the mobile devices 130. For instance, in FIG. 4, the first mobile device 130A may receive the key 401A and the first IPv6 304A of the first OP-IoT device 110A. Also, the third mobile device 130C may receive the keys 401A and 401C and the IPv6s 304A and 304C of the first and the third OP-IoT devices 110A and 110C.

Using the keys 401 and the IPv6s 304, the mobile devices 130 may communicate an access request for the public information 306 from the OP-IoT devices 110 that are within the particular proximity 418. The access request may include the keys 401 and/or the IPv6s 304. In these embodiments, the mobile devices 130 may receive the public information 306 from the OP-IoT devices 110.

Additionally or alternatively, in response to the access request, the OP-IoT devices 110 may communicate the public information 306 to the cloud server 115. The cloud server 115 may then relay the public information to the mobile devices 130.

In some embodiments, the cloud server 115 may be configured to communicate the public information 306 to the mobile devices 130. The public information 306 communicated by the cloud server 115 may include the public information 306 for the OP-IoT devices 110 that are within the particular proximity of the mobile device 130. For instance, in FIG. 4, the first mobile device 130A may receive the first public information 306A from the cloud server 115. The third mobile device 130C may receive the second and third public information 306A and 306C.

Figure 5A:
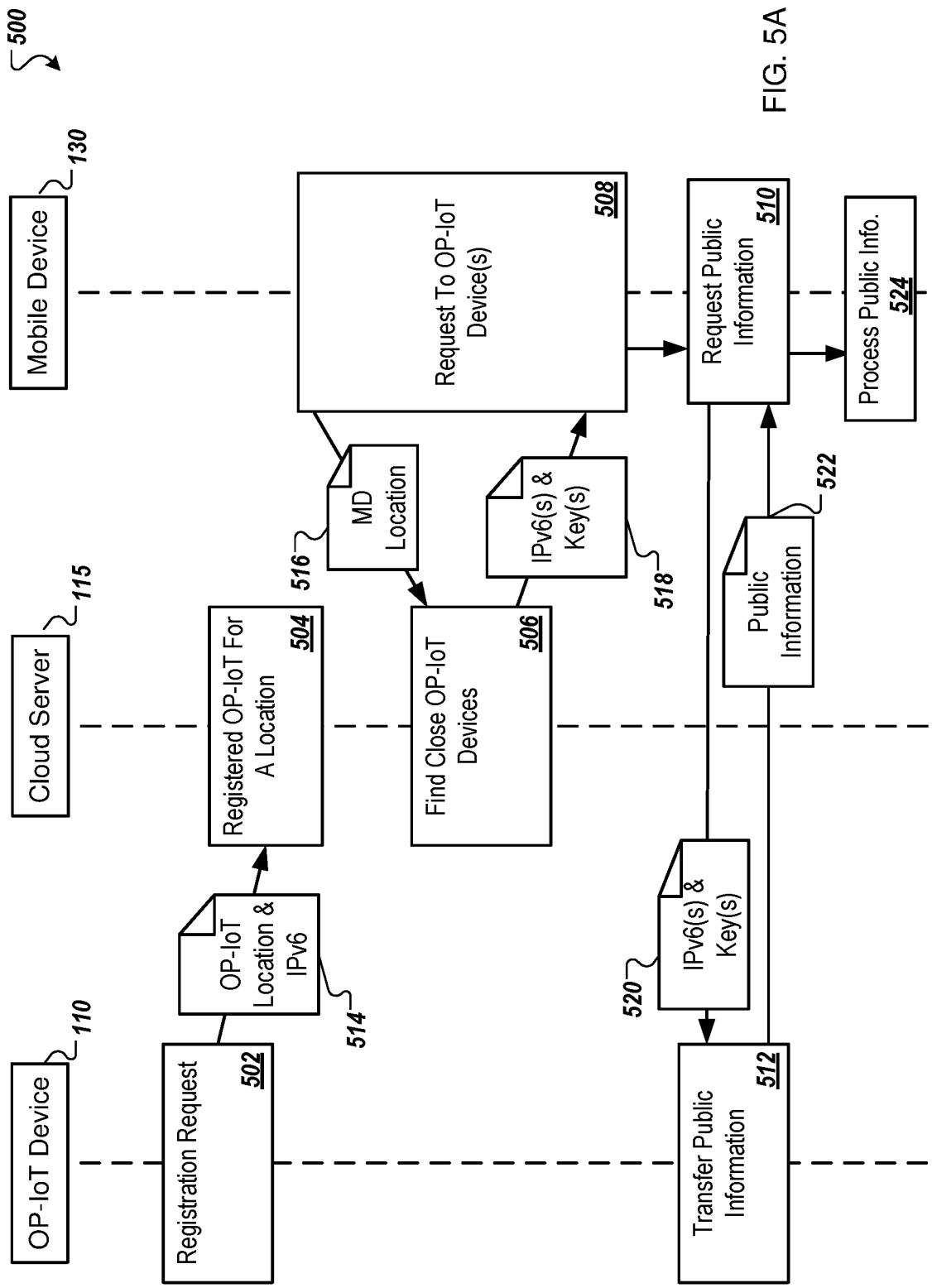
FIG. 5A depicts an example first peer-to-cloud (P2C) process that may be implemented in the operating environment of FIG. 1.

FIG. 5A depicts an example first peer-to-cloud (P2C) process 500 that may be implemented in the OP-IoT system 100 of FIG. 1. FIG. 5A is a flow diagram that illustrates one or more steps in an example sequence. Additionally, FIG. 5A includes the OP-IoT device 110, the cloud server 115, and the mobile device 130. FIG. 5A includes the OP-IoT device 110. In some embodiments, the OP-IoT device 110 may include an IoT device with a public information module (e.g., 104) installed therein. For example, the public information module may include a software or a hardware solution that may be installed in the IoT device to enable the P2C process 500.

The blocks 502, 504, 506, 508, 510, 512, and 524 are positioned on dashed lines that extend vertically from the one of the OP-IoT device 110, the cloud server 115, or the mobile device 130. The blocks 502, 504, 506, 508, 510, 512, and 524 are positioned on one of the dashed lines. Positioning the blocks 502, 504, 506, 508, 510, 512, and 524 indicates that a step in the block may be performed by the OP-IoT device 110, the cloud server 115, or the mobile device 130 at the top of the dashed line. For instance, the OP-IoT device 110 may be configured to perform blocks 502 and 512. The cloud server 115 may be configured to perform blocks 504 and 506. The mobile device 130 may be configured to perform blocks 508, 510, and 524.

For instance, the first P2C process 500 may begin at block 502 in which the OP-IoT device 110 requests registration with the cloud server 115. As part of the registration, the OP-IoT device 110 may communicate an OP-IoT location and IPv6 address 514 of the OP-IoT device 110 to the cloud server 115. The cloud server 115 may receive the OP-IoT location and IPv6 address 514. The cloud server 115 may register the OP-IoT device 110 for a location (block 506). For instance, the cloud server 115 may register the OP-IoT device 110 for the location based on the OP-IoT location and IPv6 address 514. The cloud server 115 may also register one or more other OP-IoT devices and one or more IoT devices based on OP-IoT locations and IPv6 addresses of the other OP-IoT devices and the IoT devices.

The mobile device 130 may request OP-IoT device(s) (block 508). The mobile device 130 may communicate a mobile device location 516 (in FIG. 5A, "MD location) in the request. The cloud server 115 may receive the mobile device location 516. Based on the mobile device location 516, the cloud server 115 may be configured to find OP-IoT device(s) that are close to the mobile device 130. In particular, the cloud server 115 may be configured to find OP-IoT device(s) (e.g., 110) that are within the particular proximity of the mobile device 130.

The cloud server 115 may communicate one or more IPv6(s) and one or more unique key(s) 518 to the mobile device 130. The IPv6(s) and the unique key(s) 518 are related to the OP-IoT device(s) that are within the particular proximity of the mobile device 130. The mobile device 130 may then request public information (block 510) from the OP-IoT device 110. The request of the public information may include a communication of the IPv6(s) and unique key(s) 520 to the OP-IoT device 110.

The OP-IoT device 110 may receive the IPv6(s) and unique key(s) 520. In response to the IPv6(s) and unique key(s) 520 being correctly related to the OP-IoT device 110, the OP-IoT device 110 may transfer public information (block 512). The public information 522 may be communicated from the OP-IoT device 110 to the mobile device 130.

The mobile device 130 may process the public information 522 (block 524) using a mobile application and/or computing instructions. The mobile device 130 may accordingly generate some output that affects a state or a condition of the mobile device 130.

FIG. 5B depicts an example second peer-to-cloud (P2C) process 550 that may be implemented in the OP-IoT system 100 of FIG. 1. FIG. 5B is a flow diagram that illustrates one or more steps in an example sequence. FIG. 5B includes the OP-IoT device 110. In some embodiments, the OP-IoT device 110 may include an IoT device with a public information module (e.g., 104) installed therein. For example, the public information module may include a software or a hardware solution that may be installed in the IoT device to enable the P2C process 550.

Additionally, FIG. 5B includes the OP-IoT device 110, the cloud server 115, and the mobile device 130. The blocks 552, 554, 556, 558, 560, 562, and 576 are positioned on dashed lines that extend vertically from the one of the OP-IoT device 110, the cloud server 115, or the mobile device 130. The blocks 552, 554, 556, 558, 560, 562, and 576 are positioned on one of the dashed lines. Positioning the blocks 552, 554, 556, 558, 560, 562, and 576 indicates that a step in the block may be performed by the OP-IoT device 110, the cloud server 115, or the mobile device 130 at the top of the dashed line. For instance, the OP-IoT device 110 may be configured to perform blocks 552 and 562. The cloud server 115 may be configured to perform blocks 554 and 558. The mobile device 130 may be configured to perform blocks 556, 560, and 576.

For instance, the second P2C process 550 may begin at block 552 in which the OP-IoT device 110 configures an embedded location (block 552). For instance, the embedded location may include a particular indoor address such as "Room 1, North-East Corner & 1234 Johnson Ave." This address may be programmed based on a GPS location or input by an operator. The OP-IoT device 110 may communicate the embedded location and IPv6 address 578 of the OP-IoT device 110 to the cloud server 115. The cloud server 115 may receive the embedded location and IPv6 address 578. The cloud server 115 may register the OP-IoT device 110 for a location (block 554). For instance, the cloud server 115 may register the OP-IoT device 110 for the location based on the embedded location and IPv6 address 578. The cloud server 115 may also register one or more other OP-IoT devices and one or more IoT devices based on embedded locations and IPv6 addresses of the other OP-IoT devices and the IoT devices.

The mobile device 130 may request access to OP-IoT device(s) (block 556). The mobile device 130 may communicate a mobile device location 570 (in FIG. 5B, "MD location) in the access request. The cloud server 115 may receive the mobile device location 570. Based on the mobile device location 570, the cloud server 115 may be configured to determine whether the mobile device 130 is close to the OP-IoT device 110. In particular, the cloud server 115 may be configured to determine whether the OP-IoT device(s) (e.g., 110) that are within the particular proximity of the mobile device 130.

The cloud server 115 may communicate an IPv6 and a unique key 556 of the OP-IoT device 110 to the mobile device 130. The IPv6 and the unique key 556 are related to the OP-IoT device 110. The mobile device 130 may then request public information (block 560) from the OP-IoT device 110. The request of the public information may include a communication of the IPv6 and unique key 572 to the OP-IoT device 110.

The OP-IoT device 110 may receive the IPv6 and unique key 572. In response to the IPv6 and unique key 572 being correctly related to the OP-IoT device 110, the OP-IoT device 110 may transfer public information (block 562). The public information 574 may be communicated from the OP-IoT device 110 to the mobile device 130. The mobile device 130 may process the public information 574 (block 576) using a mobile application and/or computing instructions. The mobile device 130 may accordingly generate some output that affects a state or a condition of the mobile device 130.

Figure 6:
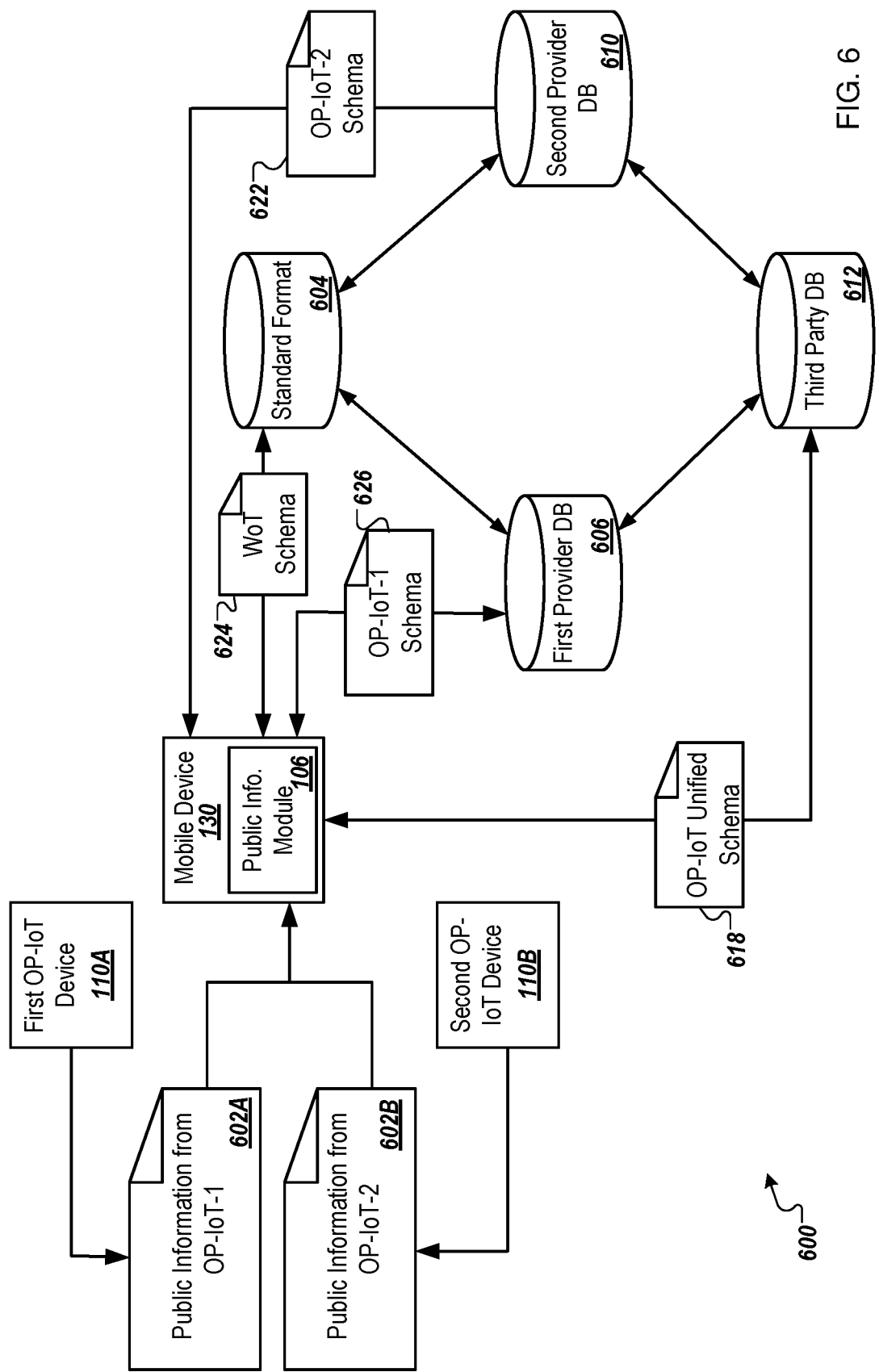
FIG. 6 illustrates an example data structure retrieval process that may be implemented in the operating environment of FIG. 1.

FIG. 6 illustrates an example data structure retrieval process (process) 600 that may be implemented in the OP-IoT system 100 of FIG. 1. The process 600 may be configured to enable the mobile device 130 to understand and/or format public information 602A and 602B for use by the public information module 106.

The public information module 106 may include, for example, a mobile device application that may be configured to use the public information 602A and 602B to obtain some results. Some examples of the mobile device application of the public information module 106 may include an application that finds a place to study or read based on light brightness data and/or temperature data included in the public information 602A and 602B and implements a machine learning process to alter the place based on user feedback; an application that finds a place to sit based on a condition (e.g., sick, tired, etc.) of a user and humidity data included in the public information 602A and 602B; an application that triggers an alarm based on carbon dioxide data included in the public information 602A and 602B.

One or more of the mobile device applications may receive the public information 602A and 602B from OP-IoT devices 110A and 110B. For example, a first OP-IoT device 110A may communicate public information 602A to the mobile device 130. The public information 602A is labeled "Public Information From OP-IoT-1" in FIG. 6. A second OP-IoT device 110B may communicate public information 602B to the mobile device 130. The public information 602A is labeled "Public Information From OP-IoT-2" in FIG. 6. In some embodiments, the public information 602A and 602B may be formatted as JSON files or another suitable file for communication of the public information 602A and 602B in a raw form or a form that may enable use by multiple mobile devices (e.g., 130) and/or multiple public information modules (e.g., 106).

At the mobile device 130, one or more data structures such as schema may be used by the public information module 106 such that the public information 602A and 602B may be processed and/or used. In some embodiments, the mobile device 130 may retrieve or otherwise access a data structure that is unique or substantially unique to each of the OP-IoT devices 110A or 110B. In these and other embodiments, a first provider database 606 may be associated with the first OP-IoT device 110A. The first provider database 606 may provide an OP-IoT-1 schema 626 to the mobile device 130. The mobile device 130 may process the public information 602A from the first OP-IoT device 110A using the OP-IoT-1 schema 626. Similarly, a second provider database 610 may be associated with the second OP-IoT device 110B. The second provider database 610 may provide an OP-IoT-2 schema 622 to the mobile device 130. The mobile device 130 may process the public information 602B from the second OP-IoT device 110B using the OP-IoT-2 schema 622. The OP-IoT-2 schema 622 may not be usable with the public information 602A and likewise the OP-IoT-1 schema 626 may not be usable with the public information 602B. FIG. 6 includes two OP-IoT devices 110A and 110B and two provider databases 606 and 610. Other embodiments may include more than two OP-IoT devices and more than two provider databases. Additionally, in some embodiments only a subset of the OP-IoT devices 110A and 110B may have associated therewith a provider database and schema. For instance, the first provider database 606 may be associated with the first OP-IoT device 110A. The first provider database 606 may provide the OP-IoT-1 schema 626 to the mobile device 130. The second OP-IoT device 110B may be processed using another data structure or schema as described below.

The mobile device 130 may retrieve or otherwise access a data structure that is unique or substantially unique to a device type of the OP-IoT devices 110A and/or 110B. For instance, in some embodiments the OP-IoT devices 110A and/or 110B may be a similar or the same type. For example, the OP-IoT devices 110A and 110B may measure the same physical phenomena, may be produced by the same or related companies, may communicate the public information 602A and 602B in a similar way, or otherwise be characterized as the same device type. A third party database 612 may communicate or enable retrieval of an OP-IoT unified schema 618. The OP-IoT unified schema 618 may be configured to enable processing of the public information 602A and 602B. The OP-IoT unified schema 618 may also be used to enable processing of public information from other OP-IoT devices (e.g., 110) that are of the same device type. The OP-IoT unified schema 618 may not be usable with other OP-IoT devices that are of another device type (e.g., measures different physical phenomena, etc.).

In some embodiments, the third party database 612 may access or communicate with the first provider database 606 and the second provider database 610. The OP-IoT unified schema 618 may be based on schema or other information provided by the first provider database 606 and the second provider database 610. For instance, the OP-IoT unified schema 618 may be based on the OP-IoT-1 schema 626 and the OP-IoT-2 schema 622.

In addition, the third party database 612 may be configured for integrity verification of the public information 602A and 602B. For instance, the use of the OP-IoT unified schema 618 may ensure that the public information 602A and 602B conforms to a particular format. Conformity with the particular format may further ensure that the public information 602A and 602B includes a particular degree of integrity.

Additionally or alternatively, the mobile device 130 may retrieve or otherwise access a standard model in the form of a web of things (WoT)-based unified schema (in FIG. 6 "WoT schema) 624. The WoT-based unified schema 624 may be configured to enable processing of public information 602A and 602B from multiple, unrelated OP-IoT devices 110. For example, in some embodiments, the public information 602A from the first OP-IoT device 110A may be different and may include different data from the public information 602B from the second OP-IoT device 110B. The WoT-based unified schema 624 may be configured to format and structure the public information 602A and 602B such that the mobile device 130 may process the public information 602A and 602B.

Figure 7:
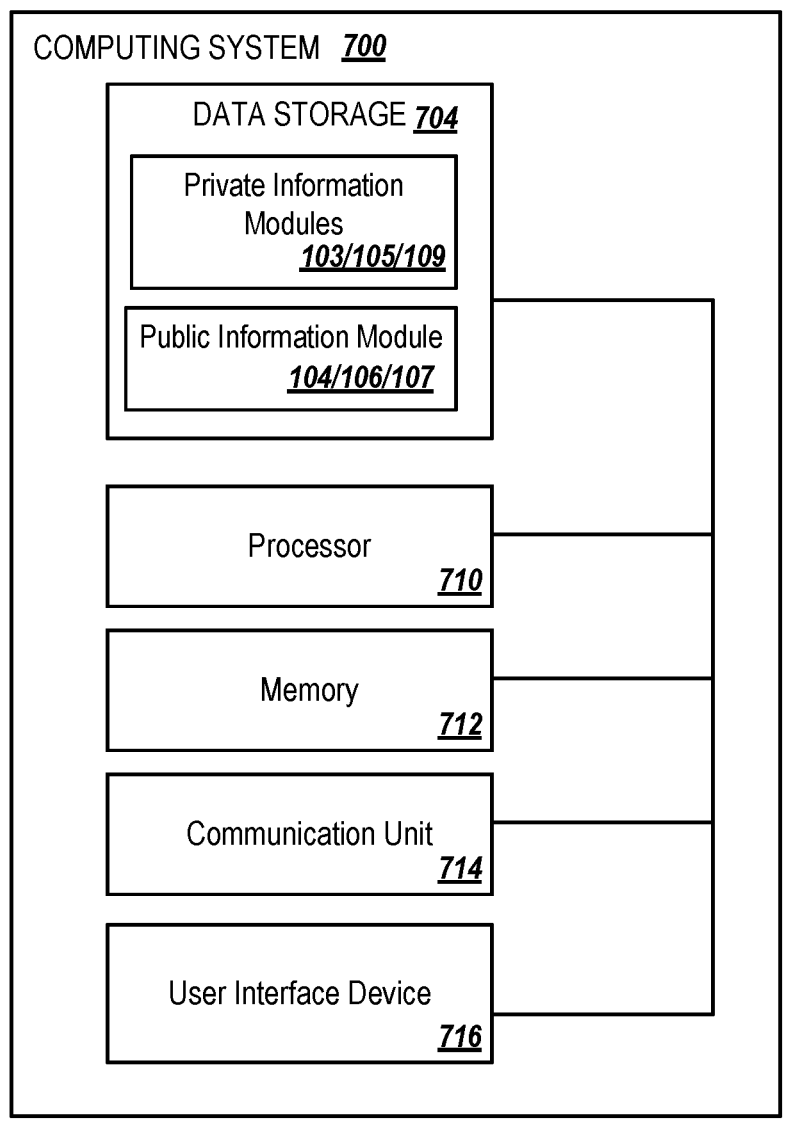
FIG. 7 is a block diagram of an example computing system that is configured for public information communication.

FIG. 7 illustrates an example computing system 700 configured for public information communication according to at least one embodiment of the present disclosure. The computing system 700 may be implemented in the OP-IoT system 100 of FIG. 1, for instance. Examples of the computing system 700 may include the IoT device 102, the registered device 108, the cloud server 115, the mobile device 130, the OP-IoT device 110, or some combination thereof. The computing system 700 may include one or more processors 710, a memory 712, a communication unit 714, the user interface device 716, and a data storage 704 that includes the private information modules 103/105/109 and/or the public information modules 104/106/107 (collectively, modules 103-107/109).

The processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 7, the processor 710 may more generally include any number of processors configured to perform individually or collectively any number of operations described in the present disclosure. Additionally, one or more of the processors 710 may be present on one or more different electronic devices or computing systems. In some embodiments, the processor 710 may interpret and/or execute program instructions and/or process data stored in the memory 712, the data storage 704, or the memory 712 and the data storage 704. In some embodiments, the processor 710 may fetch program instructions from the data storage 704 and load the program instructions in the memory 712. After the program instructions are loaded into the memory 712, the processor 710 may execute the program instructions.

The memory 712 and the data storage 704 may include computer-readable storage media for carrying or having computer-executable instructions or data structures stored thereon. Such computer-readable storage media may include any available media that may be accessed by a general-purpose or special-purpose computer, such as the processor 710. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 710 to perform a certain operation or group of operations.

The communication unit 714 may include one or more pieces of hardware configured to receive and send communications. In some embodiments, the communication unit 714 may include one or more of an antenna, a wired port, and modulation/demodulation hardware, among other communication hardware devices. In particular, the communication unit 714 may be configured to receive a communication from outside the computing system 700 and to present the communication to the processor 710 or to send a communication from the processor 710 to another device or network (e.g., 124 of FIG. 1). Some examples of the communication unit 714 include the WiFi unit 208, the other wireless connection unit 210, and the BLUETOOTH v5 unit 236.

The user interface device 716 may include one or more pieces of hardware configured to receive input from and/or provide output to a user. In some embodiments, the user interface device 716 may include one or more of a speaker, a microphone, a display, a keyboard, a touch screen, or a holographic projection, among other hardware devices.

The modules 103-107/109 may include program instructions stored in the data storage 704. The processor 710 may be configured to load the modules 103-107/109 into the memory 712 and execute the modules 103-107/109. Alternatively, the processor 710 may execute the modules 103-107/109 line-by-line from the data storage 704 without loading them into the memory 712. When executing the modules 103-107/109, the processor 710 may be configured to perform a public information communication as described elsewhere in this disclosure.

Modifications, additions, or omissions may be made to the computing system 700 without departing from the scope of the present disclosure. For example, in some embodiments, the computing system 700 may not include the user interface device 716. In some embodiments, the different components of the computing system 700 may be physically separate and may be communicatively coupled via any suitable mechanism. For example, the data storage 704 may be part of a storage device that is separate from a server, which includes the processor 710, the memory 712, and the communication unit 714, that is communicatively coupled to the storage device. The embodiments described herein may include the use of a special-purpose or general-purpose computer including various computer hardware or software modules, as discussed in greater detail below.

Figure 8A:
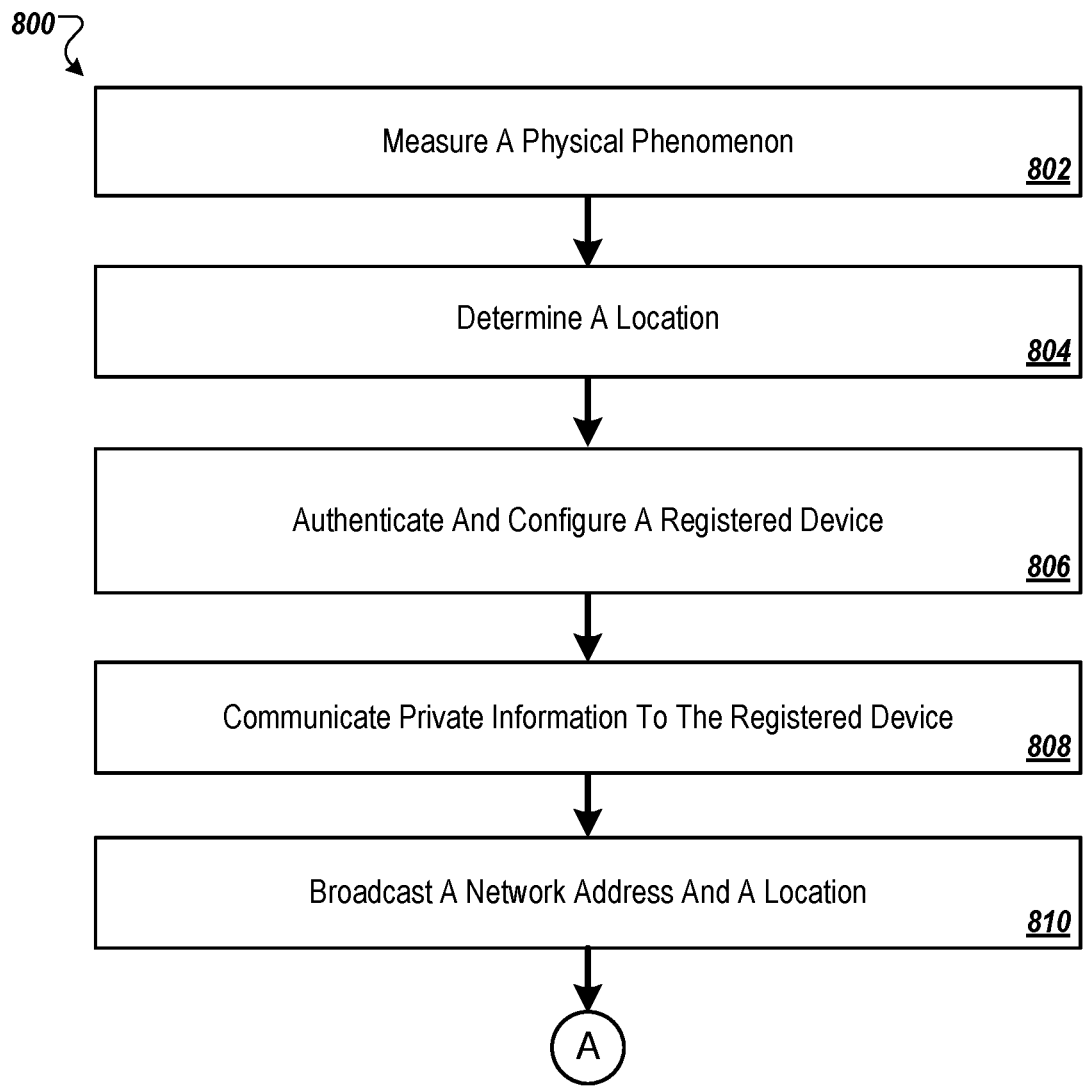
FIGS. 8A and 8B are a flow chart of an example method of public information communication from an IoT device that may be implemented in the operating environment of FIG. 1, all according to at least one embodiment described in the present disclosure.
Figure 8B:
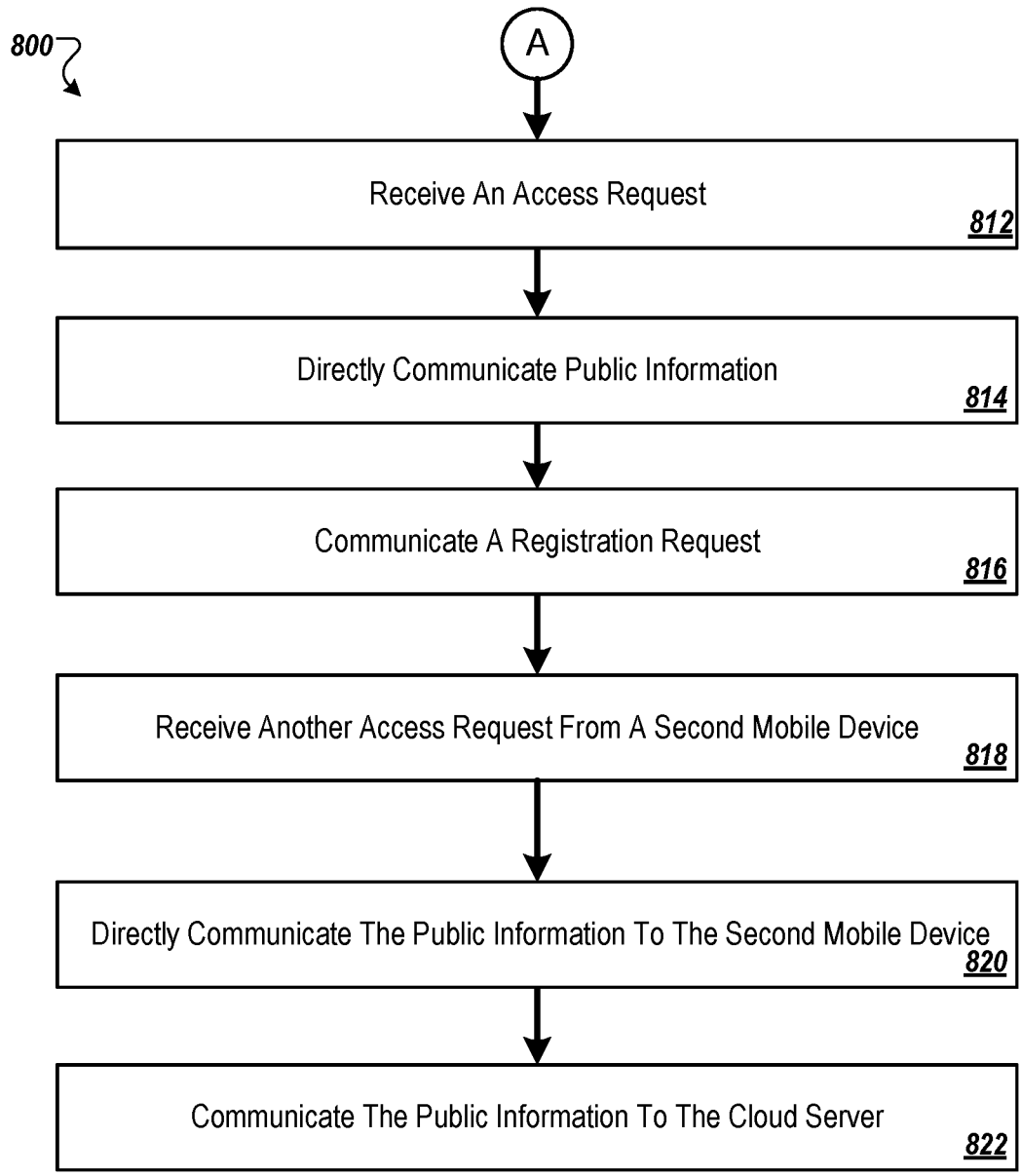

FIGS. 8A and 8B are a flow chart of an example method 800 of public information communication from an OP-IoT device or an IoT device, according to at least one embodiment described in the present disclosure. The method 800 may be performed in an operating environment such as the OP-IoT system 100 of FIG. 1. The method 800 may be programmably performed at least partially in some embodiments by the IoT device 110, the IoT device 102, the cloud server 115, the mobile device 130, or some combination thereof described in the present disclosure. In some embodiments, the OP-IoT device 110, the IoT device 102, or another computing system may include or may be communicatively coupled to a non-transitory computer-readable medium (e.g., the memory 712 of FIG. 7) having stored thereon programming code or instructions that are executable by one or more processors (such as the processor 710 of FIG. 7) to cause a computing system, the OP-IoT device 110, or the IoT device 102 to perform or control performance of the method 800. Additionally or alternatively, the OP-IoT device 110 or the IoT device 102 may include the processor 710 described elsewhere in this disclosure that is configured to execute computer instructions to cause the OP-IoT device 110, the IoT device 102, or another computing system to perform or control performance of the method 800. Although illustrated as discrete blocks, various blocks in FIGS. 8A and 8B may be divided into additional blocks, combined into fewer blocks, or eliminated, depending on the desired implementation.

The method 800 may begin at block 802 in which a physical phenomenon may be measured. The physical phenomenon may be measured by a physical sensor. The physical phenomenon may include one or more physical phenomena that may be occurring in an environment of the physical sensor.

Some examples of the physical sensor may include a brightness sensor, a dust concentration sensor, a temperature sensor, a humidity sensor, a wind sensor, a carbon monoxide sensor, a carbon dioxide sensor, an acoustic sensor, an air pollution sensor, a soil sensor, a pressure sensor, a traffic light status sensor, a locational sensor, a magnetic field sensor, a radiation sensor, a solar sensor, an alarm sensor, a biometric sensor, a precipitation sensor, a vehicle detector, a liquid level sensor, an air flow sensor, a water temperature sensor, a seat occupancy sensor, WiFi sensor, or a geographic sensor.

Accordingly, the physical phenomena may include light, presence and/or concentration of dust, a thermal condition, humidity, wind or a characteristic (e.g., velocity) thereon, carbon monoxide, carbon dioxide, presence and/or characteristics (e.g., frequencies, amplitude, etc.), sound, presence and/or concentration of one or more pollutants, characteristics of soil, atmospheric pressure, hydraulic pressure, traffic conditions (e.g., rate of speed, delay due to traffic, state of a traffic light, etc.), a characteristic of the phenomenon (e.g., crowds, etc.), presence of or characteristics of a magnetic field, presence of or characteristics of some form of radiation (e.g., gamma rays or intensity thereof), solar intensity, a state of an alarm, a physiological characteristic (e.g., heart rate, skin perspiration, blood oxygen levels, blood pressure, etc.), presence of or characteristics (velocity, operating condition, etc.), of a vehicle, an amount of liquid, an air flow rate, whether a seat is occupied, presence of or characteristics of a WiFi signal or bandwidth thereof, a location, and the like.

At block 804, a location of the OP-IoT device or the IoT device may be determined. The location of the OP-IoT device or the IoT device may be determined based on a measurement made using an embedded locational sensor. The location may include an indoor embedded location of the OP-IoT device or the IoT device. For instance, the indoor embedded location may be a particular location in a room or structure (e.g., a warehouse, factory, residence, etc.), in a city (e.g., at an intersection, at a particular commercial location, etc.), along an assembly line, at a particular piece of equipment, and the like.

At block 806, a registered device may be authenticated and configured. The registered device may be authenticated and configured such that the registered device is communicatively coupled to the OP-IoT device or the IoT device via a communication network. At block 808, private information may be communicated to the registered device. The private information may be communicated via the communication network. The private information may be communicated via the communication network in response to a request of the private information by the registered device. The private information may include data being measured by the physical sensor for specific use by the registered device.

At block 810, a network address and the location of the OP-IoT device or the IoT device may be broadcast. The network address and the location of the OP-IoT device or the IoT device may be broadcast such that mobile devices within a particular proximity of the OP-IoT device or the IoT device has access to the network address and the location. The location includes an indoor location and/or the network address includes an IPv6 address. Referring to FIG. 8B, at block 812, an access request may be received for public information. The access request may be received at the network address and from a mobile device of the mobile devices that are positioned within a particular proximity to the OP-IoT device or the IoT device.

The public information includes a raw form of data measured by the physical sensor that is configured to be locally processed on the mobile devices. For example, the private information may be configured for specific use by the registered device. The private information may have a particular form, format, organization, etc., such that the registered device may process the private information. The public information may be a generic or raw form that may allow processing by multiple or most mobile devices.

The public information may be a raw form of data measured by the physical sensor, configured to be locally processed on the mobile device. The public information is configured to be processed by the mobile device according to a data structure that is unique or substantially unique to the OP-IoT device or the IoT device, a unified schema that is unique or substantially unique to a device type of the OP-IoT device or the IoT device, a standard model that includes a Web of Things (WoT)-based unified schema or some combination thereof.

In some embodiments, the mobile device may include a smart phone, a vehicle, a robot, a machine, an aerial drone, or another mobile device. In some embodiments, the mobile device includes an application that is configured to use the public information retrieved from the OP-IoT device. In particular, the application may be configured to process the public information or a portion thereof. Some examples of the application may include a smart city application configured to provide information to citizens of a city; an environmental/community application that may enable a robot, a drone, or a driverless car to understand the environment or community based on the public data; a traffic application configured for notification of a state of a traffic light, a store information application, an indoor map application, a live air pollution application, and a manufacturer status application.

At block 814, the public information may be directly communicated. The public information may be directly communicated to the mobile device via a communication network without authentication or configuration between the OP-IoT device and the mobile device.

At block 816 a registration request may be communicated to a cloud server. The registration request may include the network address, the location, and a unique key of the OP-IoT device. The location may be used at the cloud server for comparison relative to a mobile device location of a second mobile device received at the cloud server in a determination of whether the second mobile device is within the particular proximity of the OP-IoT device.

At block 818, another access request may be received. The other access request may be received from the second mobile device at the network address. The other access request may include the unique key. At block 820, the public information may be directly communicated. The public information may be directly communicated to the second mobile device via the communication network without authentication or configuration between the OP-IoT device and the second mobile device. At block 822, the public information may be communicated to the cloud server. The public information may be communicated to the cloud server for communication to the second mobile device.

In some embodiments, the network address and the location are broadcast using a first communication protocol that is different from a second communication protocol via which the private information and the public information are communicated on the communication network. For instance, the first communication protocol may include a BLUETOOTH® v5 communication protocol and the second communication protocol includes a WLAN protocol or a WPAN communication protocol.

It may be appreciated that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

The present disclosure is not to be limited in terms of the particular embodiments described herein, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of this disclosure. Also, the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that include A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that include A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

For any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, and/or others. As a non-limiting example, each range discussed herein can be readily broken down into a lower third, middle third and upper third, etc. All language such as "up to," "at least," and the like include the number recited and refer to ranges which can be subsequently broken down into sub ranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various embodiments of the present disclosure have been described herein for purposes of illustration, and various modifications may be made without departing from the scope and spirit of the present disclosure. Accordingly, the various embodiments disclosed herein are not intended to be limiting.

What is claimed is:

1. An open public Internet-of-Things (OP-IoT) system comprising:
an OP-IoT device that includes:
a physical sensor that is configured to measure a physical phenomenon;
a locational sensor configured to determine a location of the OP-IoT device;
a communication unit;
one or more processors; and
a non-transitory memory having encoded thereon computer-readable instructions that, in response to execution by the one or more processors, cause performance of operations comprising:
authenticating and configuring a registered device such that the registered device is communicatively coupled to the OP-IoT device via a communication network;
communicating private information with the registered device via the communication network, the private information including data measured by the physical sensor that is configured for specific use by the registered device;
broadcasting a network address of the OP-IoT device and the location of the OP-IoT device such that mobile devices within a particular proximity of the OP-IoT device has access to the network address and the location;
receiving an access request for public information at the network address from a mobile device of the mobile devices that are positioned within a particular proximity to the OP-IoT device, the public information includes a raw form of data measured by the physical sensor that is configured to be locally processed on the mobile devices; and
directly communicating the public information to the mobile device via a communication network without authentication or configuration between the OP-IoT device and the mobile device.

2. The OP-IoT system of claim 1, wherein the network address and the location are broadcast using a first communication protocol that is different from a second communication protocol via which the private information and the public information are communicated on the communication network.

3. The OP-IoT system of claim 2, wherein:
the first communication protocol includes a BLUETOOTH® v5 communication protocol; and
the second communication protocol includes a WLAN protocol or a WPAN communication protocol.

4. The OP-IoT system of claim 1, wherein:
the location includes an indoor location; and
the network address includes an IPv6 address.

5. The OP-IoT system of claim 1, wherein:
the physical sensor includes one or more of a brightness sensor, a dust concentration sensor, a temperature sensor, a humidity sensor, a wind sensor, a carbon monoxide sensor, a carbon dioxide sensor, an acoustic sensor, an air pollution sensor, a soil sensor, a pressure sensor, a traffic light status sensor, a locational sensor related to a phenomenon, a magnetic field sensor, a radiation sensor, a solar sensor, an alarm sensor, a biometric sensor, a precipitation sensor, a vehicle detector, a liquid level sensor, an air flow sensor, a water temperature sensor, a seat occupancy sensor, WiFi sensor, or a geographic sensor; and
the mobile device includes one or more of a smart phone, a vehicle, a robot, a machine, or an aerial drone.

6. The OP-IoT system of claim 1, further comprising a provider database that enables retrieval of a data structure by the mobile device for processing of the public information, wherein:
the public information configured to be processed by the mobile device according to:
a first data structure that is unique or substantially unique to the OP-IoT device;
a unified schema that is unique or substantially unique to a device type of the OP-IoT device; or
a standard model that includes a web of things (WoT)-based unified schema.

7. The OP-IoT system of claim 1, further comprising a cloud server, wherein:
the operations further comprise communicating a registration request to the cloud server;
the registration request includes the network address, the location, and a unique key of the OP-IoT device; and
the cloud server is configured to receive a mobile device location of a second mobile device and compare the location relative to the mobile device location to determine whether the second mobile device is within the particular proximity of the OP-IoT device.

8. The OP-IoT system of claim 7, wherein:
the cloud server is configured to communicate the unique key and the network address to the second mobile device responsive to a determination that the second mobile device is within the particular proximity of the OP-IoT device; and
the operations further comprise:
receiving another access request from the second mobile device at the network address that includes the unique key; and
directly communicating the public information to the second mobile device via the communication network without authentication or configuration between the OP-IoT device and the second mobile device.

9. The OP-IoT system of claim 7, wherein:
the operations further comprise communicating the public information to the cloud server; and
the cloud server is configured to communicate the public information to the second mobile device responsive to a determination that the second mobile device is within the particular proximity of the OP-IoT device.

10. The OP-IoT system of claim 1, further comprising a cloud server and one or more other OP-IoT devices, wherein:
the operations further comprise communicating a registration request to the cloud server that includes the network address, the location, and a unique key of the OP-IoT device; and
the cloud server is configured to receive a mobile device location of a second mobile device and compare the location of the OP-IoT device and locations of the one or more other OP-IoT devices to the mobile device location to determine whether the second mobile device is within the particular proximity of the OP-IoT device or the one or more other OP-IoT devices; and
the cloud server is configured to communicate the unique keys and the network addresses to the second mobile device of each of the one or more other OP-IoT devices and the OP-IoT device responsive to a determination that the second mobile device is within the particular proximity of the one or more other OP-IoT devices and the OP-IoT device.

11. A method of public information communication from an Internet-of-Things (IoT) device, the method comprising:
measuring a physical phenomenon by a physical sensor of an IoT device;
determining a location of an IoT device using a locational sensor of the IoT device;
broadcasting a network address of the IoT device and the location of the IoT device such that mobile devices within a particular proximity of the IoT device has access to the network address and the location;
receiving an access request for public information at the network address from a mobile device of the mobile devices that are positioned within a particular proximity to the IoT device, wherein the public information includes a raw form of data measured by the physical sensor that is configured to be locally processed on the mobile devices; and
directly communicating the public information to the mobile device via a communication network without authentication or configuration between the IoT device and the mobile device.

12. The method of claim 11, further comprising:
authenticating and configuring a registered device such that the registered device is communicatively coupled to the IoT device via the communication network; and
communicating private information with the registered device via the communication network, the private information including data measured by the physical sensor that is configured for specific use by the registered device.

13. The method of claim 12, wherein the network address and the location are broadcast using a first communication protocol that is different from a second communication protocol via which the private information and the public information are communicated on the communication network.

14. The method of claim 13, wherein:
the first communication protocol includes a BLUETOOTH® v5 communication protocol; and
the second communication protocol includes a WLAN protocol or a WPAN communication protocol.

15. The method of claim 11, wherein:
the location includes an indoor location; and
the network address includes an IPv6 address.

16. The method of claim 11, wherein:
the physical sensor includes one or more of a brightness sensor, a dust concentration sensor, a temperature sensor, a humidity sensor, a wind sensor, a carbon monoxide sensor, a carbon dioxide sensor, an acoustic sensor, an air pollution sensor, a soil sensor, a pressure sensor, a traffic light status sensor, a locational sensor related to a phenomenon, a magnetic field sensor, a radiation sensor, a solar sensor, an alarm sensor, a biometric sensor, a precipitation sensor, a vehicle detector, a liquid level sensor, an air flow sensor, a water temperature sensor, a seat occupancy sensor, WiFi sensor, or a geographic sensor; and
the mobile device includes one or more of a smart phone, a vehicle, a robot, a machine, or an aerial drone.

17. The method of claim 11, wherein the public information is configured to be processed by the mobile device according to:
a data structure that is unique or substantially unique to the IOT device;
a unified schema that is unique or substantially unique to a device type of the IoT device; or
a standard model that includes a web of things (WoT)-based unified schema.

18. The method of claim 11, further comprising:
communicating a registration request to a cloud server, wherein:
the registration request includes the network address, the location, and a unique key of the IoT device; and
the location is used at the cloud server for comparison relative to a mobile device location received at the cloud server in a determination of whether a second mobile device is within the particular proximity of the IoT device.

19. The method of claim 18, further comprising:
receiving another access request from the second mobile device at the network address that includes the unique key; and
directly communicating the public information to the second mobile device via the communication network without authentication or configuration between the IoT device and the second mobile device.

20. The method of claim 18, further comprising communicating the public information to the cloud server for communication to the second mobile device.

\* \* \* \* \*